United States Patent
Smith et al.

(10) Patent No.: US 9,722,286 B2
(45) Date of Patent: *Aug. 1, 2017

(54) BATTERY PACK AND METHOD OF CONTROLLING AN ELECTRIC FAN IN THE BATTERY PACK

(71) Applicant: LG Chem, Ltd., Seoul (KR)

(72) Inventors: Alexander Jeffrey Smith, White Lake, MI (US); Richard McCormick, Troy, MI (US); Satish Ketkar, Troy, MI (US); Robert Merriman, Shelby Township, MI (US); Heekook Yang, Troy, MI (US)

(73) Assignee: LG Chem, Ltd., Seoul (KR)

( * ) Notice: Subject to any disclaimer, the term of this patent is extended or adjusted under 35 U.S.C. 154(b) by 66 days.

This patent is subject to a terminal disclaimer.

(21) Appl. No.: 14/489,613

(22) Filed: Sep. 18, 2014

(65) Prior Publication Data

US 2016/0085247 A1    Mar. 24, 2016

(51) Int. Cl.
*H01M 10/60* (2014.01)
*H01M 10/613* (2014.01)
(Continued)

(52) U.S. Cl.
CPC .......... *H01M 10/613* (2015.04); *H01M 2/10* (2013.01); *H01M 10/486* (2013.01);
(Continued)

(58) Field of Classification Search
CPC ............. H01M 10/613; H01M 10/617; H01M 10/633; H05K 7/20209
See application file for complete search history.

(56) References Cited

U.S. PATENT DOCUMENTS 8,492,642 B2    7/2013  Kim
2005/0111167 A1*  5/2005  Yamaguchi ........... B60L 15/007
                                                  361/676
(Continued)

FOREIGN PATENT DOCUMENTS

JP    2004306726    11/2004
JP    2005245054 A  *  9/2005
(Continued)

OTHER PUBLICATIONS

Machine Translation of JP 2005245054 A, obtained Apr. 27, 2016.*
(Continued)

*Primary Examiner* — Nicholas P D'Aniello
(74) *Attorney, Agent, or Firm* — Buckert Patent & Trademark Law Firm PC; John F. Buckert

(57) ABSTRACT

A battery pack is provided. The battery pack includes first and second temperature sensors that are disposed in first and second interior spaces, respectively. The first temperature sensor generates a first signal indicative of a first temperature level of the battery cell. The second temperature sensor generates a second signal indicative of a second temperature level of the DC-DC voltage converter. The battery pack further includes a microprocessor that determines a first fan speed percentage value of the electric fan based on the first temperature level, and a second fan speed percentage value of the electric fan based on the second temperature level. The microprocessor selects the first fan speed percentage value if the first fan speed percentage value is greater than the second fan speed percentage value.

10 Claims, 24 Drawing Sheets

(51) Int. Cl.
  *H01M 10/48* (2006.01)
  *H01M 10/63* (2014.01)
  *H01M 10/6563* (2014.01)
  *H01M 10/6556* (2014.01)
  *H01M 10/635* (2014.01)
  *H01M 2/10* (2006.01)

(52) U.S. Cl.
  CPC ......... *H01M 10/63* (2015.04); *H01M 10/635* (2015.04); *H01M 10/6556* (2015.04); *H01M 10/6563* (2015.04); *H01M 2/1061* (2013.01); *H01M 2/1077* (2013.01)

(56) References Cited

U.S. PATENT DOCUMENTS

| | | |
|---|---|---|
| 2010/0275619 A1 | 11/2010 | Koetting et al. |
| 2010/0279152 A1 | 11/2010 | Payne |
| 2013/0071706 A1 | 3/2013 | Lee |
| 2013/0255293 A1 | 10/2013 | Gadawski et al. |
| 2014/0038007 A1 | 2/2014 | Ahn |

FOREIGN PATENT DOCUMENTS

| | | |
|---|---|---|
| JP | 2008251378 | 3/2007 |
| JP | 2013152839 | 12/2011 |
| JP | 2013055019 | 3/2013 |
| KR | 20100119499 | 6/2012 |
| KR | 1020100119497 | 6/2012 |
| KR | 20120117470 | 10/2012 |
| KR | 1020130031532 | 3/2013 |
| KR | 20130111258 | 10/2013 |
| KR | 1020140019096 | 8/2015 |

OTHER PUBLICATIONS

U.S. Appl. No. 14/273,572, filed May 9, 2014 entitled Battery Pack and Method of Assembling the Battery Pack.
U.S. Appl. No. 14/273,586, filed May 9, 2014 entitled Battery Module and Method of Assembling the Battery Module.
U.S. Appl. No. 14/287,291, filed May 27, 2014 entitled Battery Pack and Method of Controlling an Electric Fan in the Battery Pack.
U.S. Appl. No. 14/489,613, filed Sep. 18, 2014 entitled Battery Pack and Method of Controlling an Electric Fan in the Battery Pack.

* cited by examiner

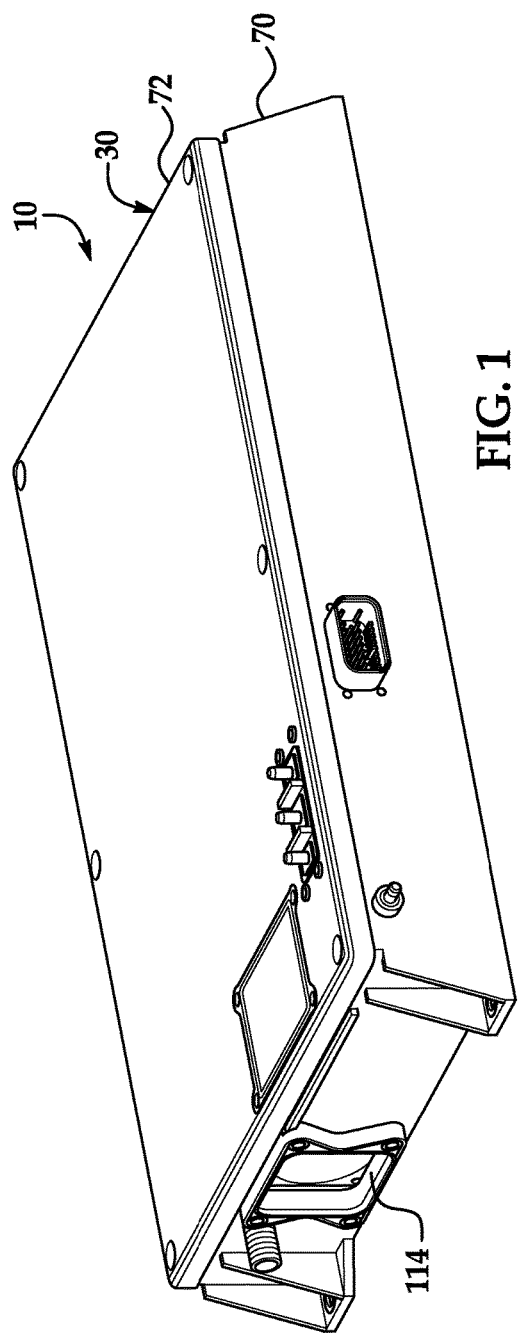
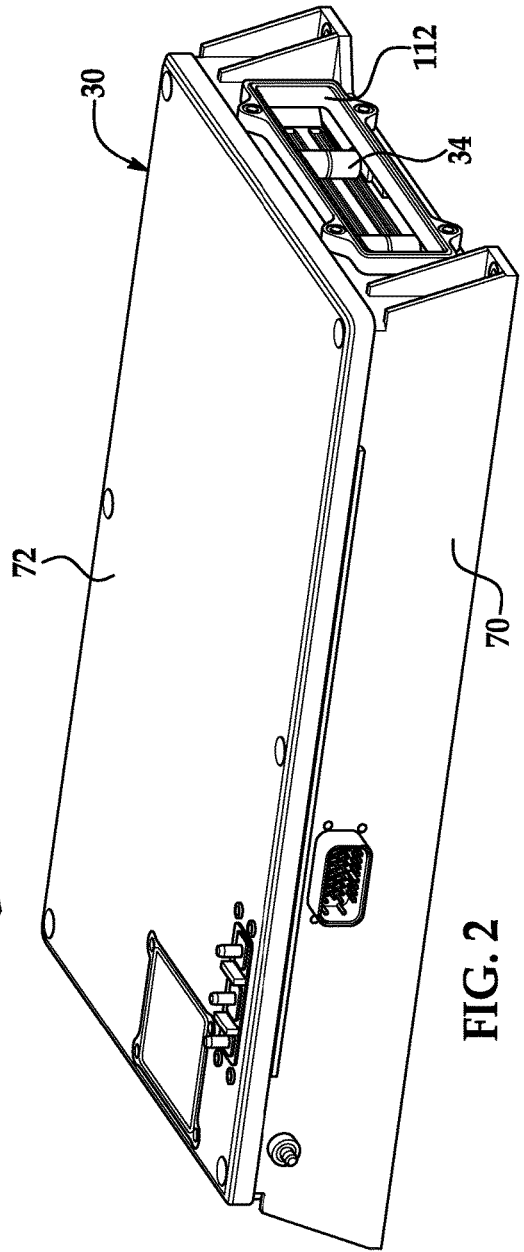

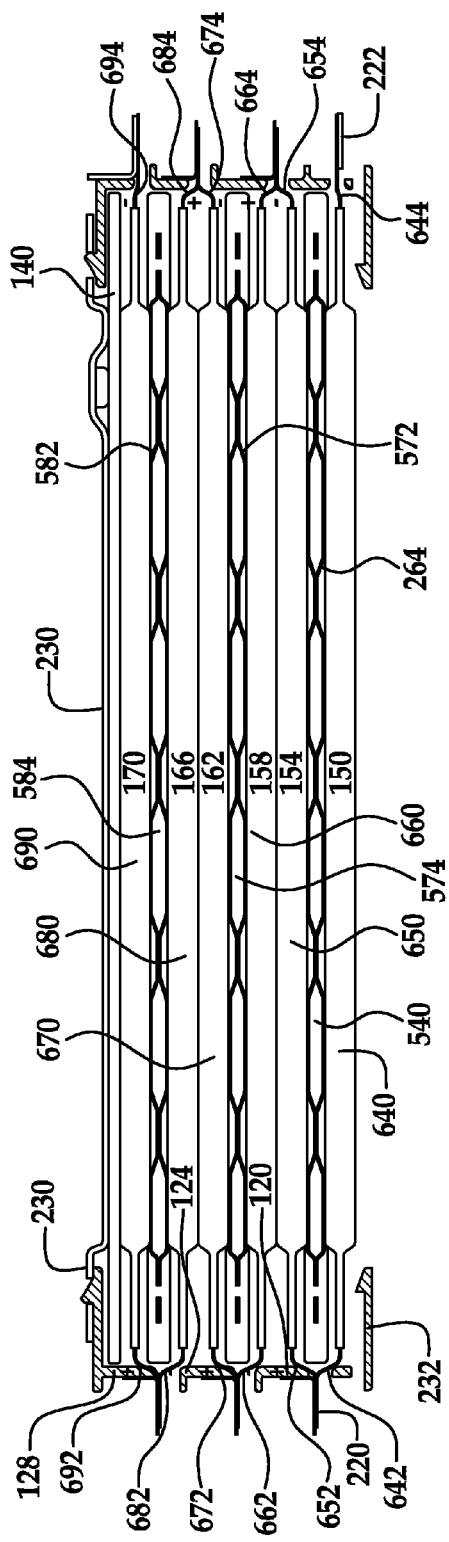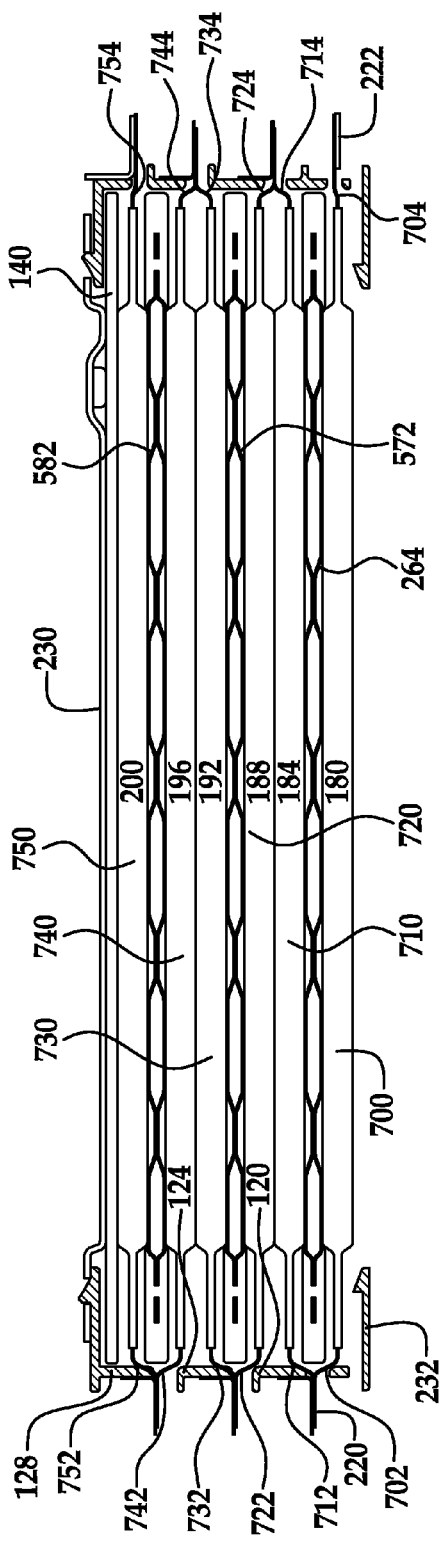

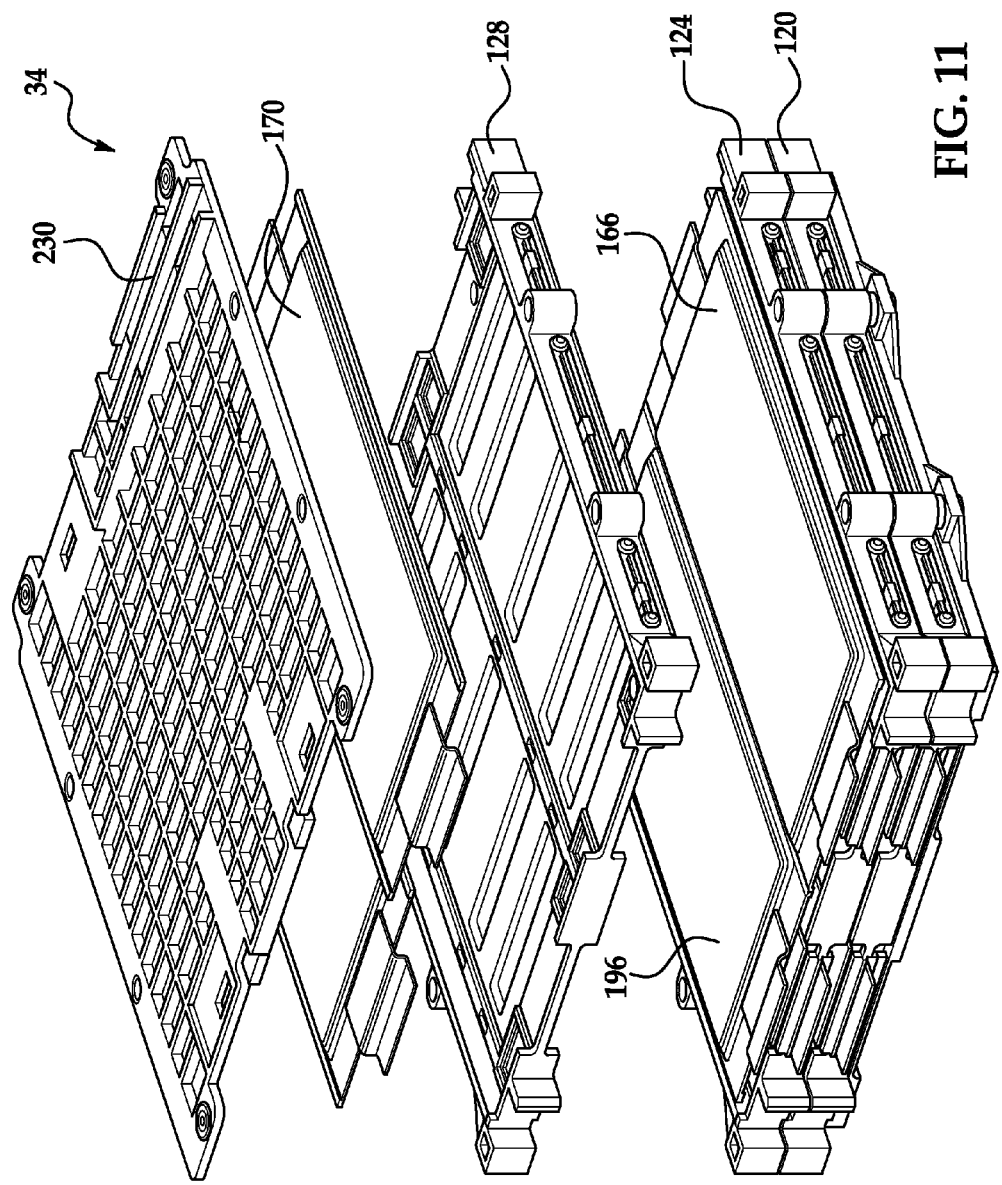

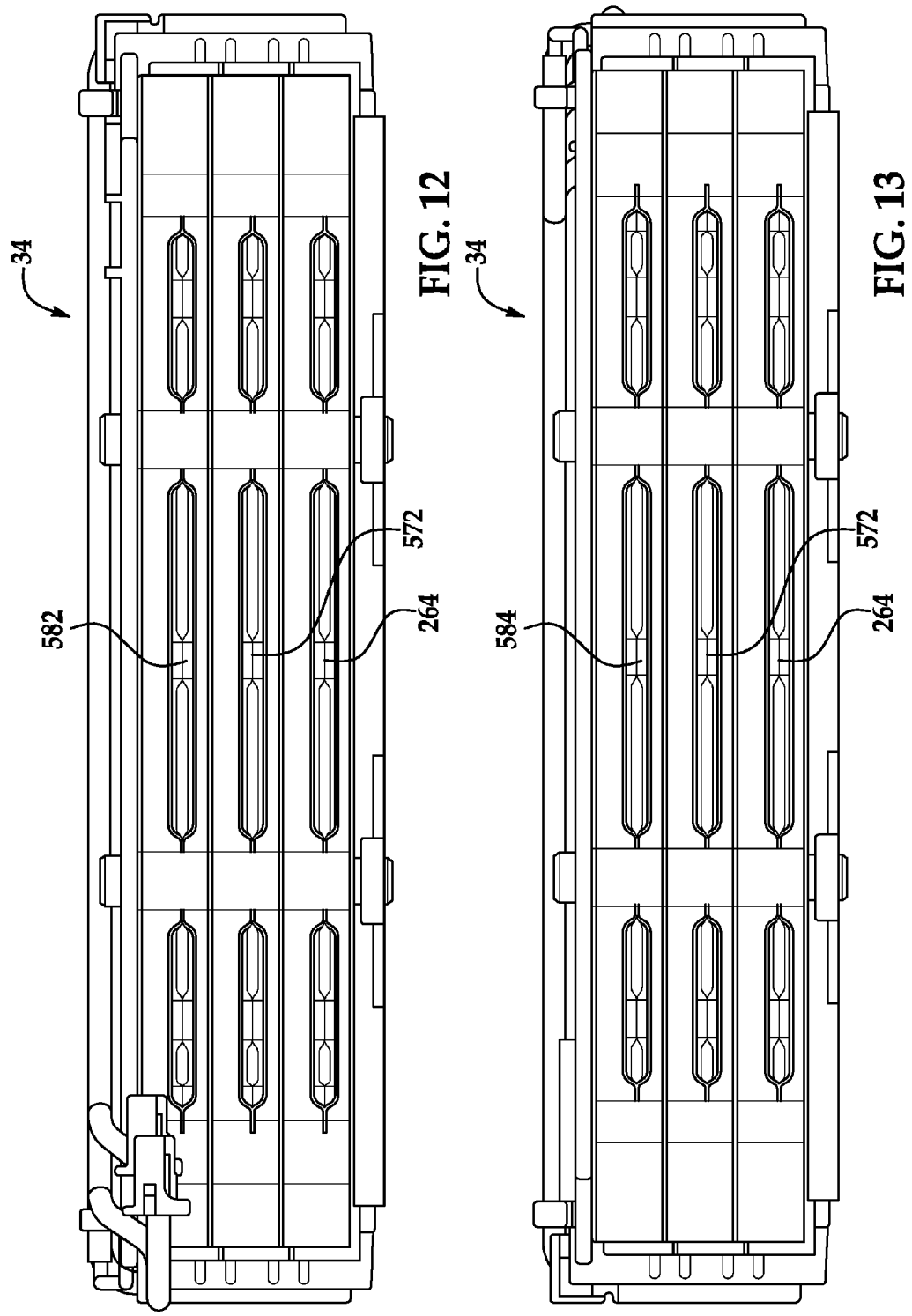

| FAN SPEED PERCENTAGE VALUE | BATTERY CELL TEMPERATURE (°C) | DC-DC VOLTAGE CONVERTER TEMPERATURE (°C) | DC-DC VOLTAGE CONVERTER ELECTRICAL OUTPUT POWER LEVEL (WATTS) | |
|---|---|---|---|---|
| 0 | <38 | <88 | <300 | 962 |
| 0.1 | 38 | 88 | 300 | 964 |
| 0.2 | 40 | 90 | 500 | 966 |
| 0.3 | 42 | 92 | 750 | 968 |
| 0.4 | 44 | 94 | 1000 | 970 |
| 0.5 | 45 | 96 | 1250 | 972 |
| 0.6 | 46 | 98 | 1500 | 974 |
| 0.7 | 47 | 100 | 1750 | 976 |
| 0.8 | 48 | 102 | 1750 | 978 |
| 0.9 | 49 | 105 | 1750 | 980 |
| 1.0 | >50 | >110 | >2000 | 982 |

| FAN SPEED PERCENTAGE VALUE | BATTERY CELL TEMPERATURE (°C) | DC-DC VOLTAGE CONVERTER TEMPERATURE (°C) | |
|---|---|---|---|
| 0 | <38 | <88 | 1162 |
| 0.1 | 38 | 88 | 1164 |
| 0.2 | 40 | 90 | 1166 |
| 0.3 | 42 | 92 | 1168 |
| 0.4 | 44 | 94 | 1170 |
| 0.5 | 45 | 96 | 1172 |
| 0.6 | 46 | 98 | 1174 |
| 0.7 | 47 | 100 | 1176 |
| 0.8 | 48 | 102 | 1178 |
| 0.9 | 49 | 105 | 1180 |
| 1.0 | >50 | >110 | 1182 |

BATTERY PACK AND METHOD OF CONTROLLING AN ELECTRIC FAN IN THE BATTERY PACK

BACKGROUND

The inventors herein have recognized a need for an improved battery pack and a method of controlling an electric fan in the battery pack.

SUMMARY

A battery pack in accordance with an exemplary embodiment is provided. The battery pack includes a battery pack housing defining an interior region having a first interior space and a second interior space. The battery pack housing has an inlet aperture communicating with the first interior space, and an outlet aperture communicating with the second interior space. The battery pack further includes a battery module that is disposed in the first interior space of the battery pack housing proximate to the inlet aperture. The battery module has at least one battery cell disposed against a heat exchanger. The heat exchanger is configured to receive air that enters the first interior space from the inlet aperture to cool the at least one battery cell. The battery pack further includes a DC-DC voltage converter that is disposed in the second interior space such that the air flowing from the heat exchanger further cools the DC-DC voltage converter. The battery pack further includes an electric fan adapted to urge the air to flow from the inlet aperture through the first and second interior spaces to the outlet aperture of the battery pack housing. The battery pack further includes a first temperature sensor that is disposed in the first interior space. The first temperature sensor is adapted to generate a first signal indicative of a first temperature level of the battery cell. The battery pack further includes a second temperature sensor disposed in the second interior space. The second temperature sensor is adapted to generate a second signal indicative of a second temperature level of the DC-DC voltage converter. The battery pack further includes a microprocessor operably coupled to the first and second temperature sensors such that the microprocessor receives the first and second signals, respectively. The microprocessor is further operably coupled to the electric fan. The microprocessor is programmed to determine a first fan speed percentage value of the electric fan based on the first temperature level. The microprocessor is further programmed to determine a second fan speed percentage value of the electric fan based on the second temperature level. The microprocessor is further programmed to select the first fan speed percentage value if the first fan speed percentage value is greater than the second fan speed percentage value. The microprocessor is further programmed to generate a first control signal that induces the electric fan to operate at an operational speed corresponding to the first fan speed percentage value if the first fan speed percentage value is selected.

A method for controlling an electric fan in a battery pack in accordance with another exemplary embodiment is provided. The method includes providing the battery pack having a battery pack housing, a battery module, a DC-DC voltage converter, a first temperature sensor, a second temperature sensor, and a microprocessor. The battery pack housing defines an interior region having a first interior space and a second interior space. The battery pack housing has an inlet aperture communicating with the first interior space, and an outlet aperture communicating with the second interior space. The battery module is disposed in the first interior space of the battery pack housing proximate to the inlet aperture. The battery module has at least one battery cell disposed against a heat exchanger. The heat exchanger is configured to receive air that enters the first interior space from the inlet aperture to cool the at least one battery cell. The DC-DC voltage converter is disposed in the second interior space such that the air flowing from the heat exchanger further cools the DC-DC voltage converter. The electric fan is adapted to urge air to flow from the inlet aperture through the first and second interior spaces to the outlet aperture of the battery pack housing. The first temperature sensor is disposed in the first interior space. The second temperature sensor is disposed in the second interior space. The microprocessor being operably coupled to the first and second temperature sensors. The method includes generating a first signal indicative of a first temperature level of the battery cell utilizing the first temperature sensor. The method further includes generating a second signal indicative of a second temperature level of the DC-DC voltage converter utilizing the second temperature sensor. The method further includes determining a first fan speed percentage value of the electric fan based on the first temperature level, utilizing the microprocessor. The method further includes determining a second fan speed percentage value of the electric fan based on the second temperature level, utilizing the microprocessor. The method further includes selecting the first fan speed percentage value if the first fan speed percentage value is greater than the second fan speed percentage value, utilizing the microprocessor. The method further includes generating a first control signal that induces the electric fan to operate at an operational speed corresponding to the first fan speed percentage value if the first fan speed percentage value is selected, utilizing the microprocessor.

BRIEF DESCRIPTION OF THE DRAWINGS

FIG. 1 is a schematic of a battery pack in accordance with an exemplary embodiment;

FIG. 2 is another schematic of the battery pack of FIG. 1;

FIG. 9 is a cross-sectional schematic of the battery module of FIG. 7 taken along lines 9-9;

FIG. 10 is a cross-sectional schematic of the battery module of FIG. 7 taken along lines 10-10;

FIG. 11 is an exploded view of a portion of the battery module of FIG. 7;

FIG. 12 is a schematic of a first side of the battery module of FIG. 7 illustrating ends of first, second, and third heat exchangers;

FIG. 13 is a schematic of a second side of the battery module of FIG. 7 illustrating ends of first, second, and third heat exchangers;

DETAILED DESCRIPTION

Figure 3:
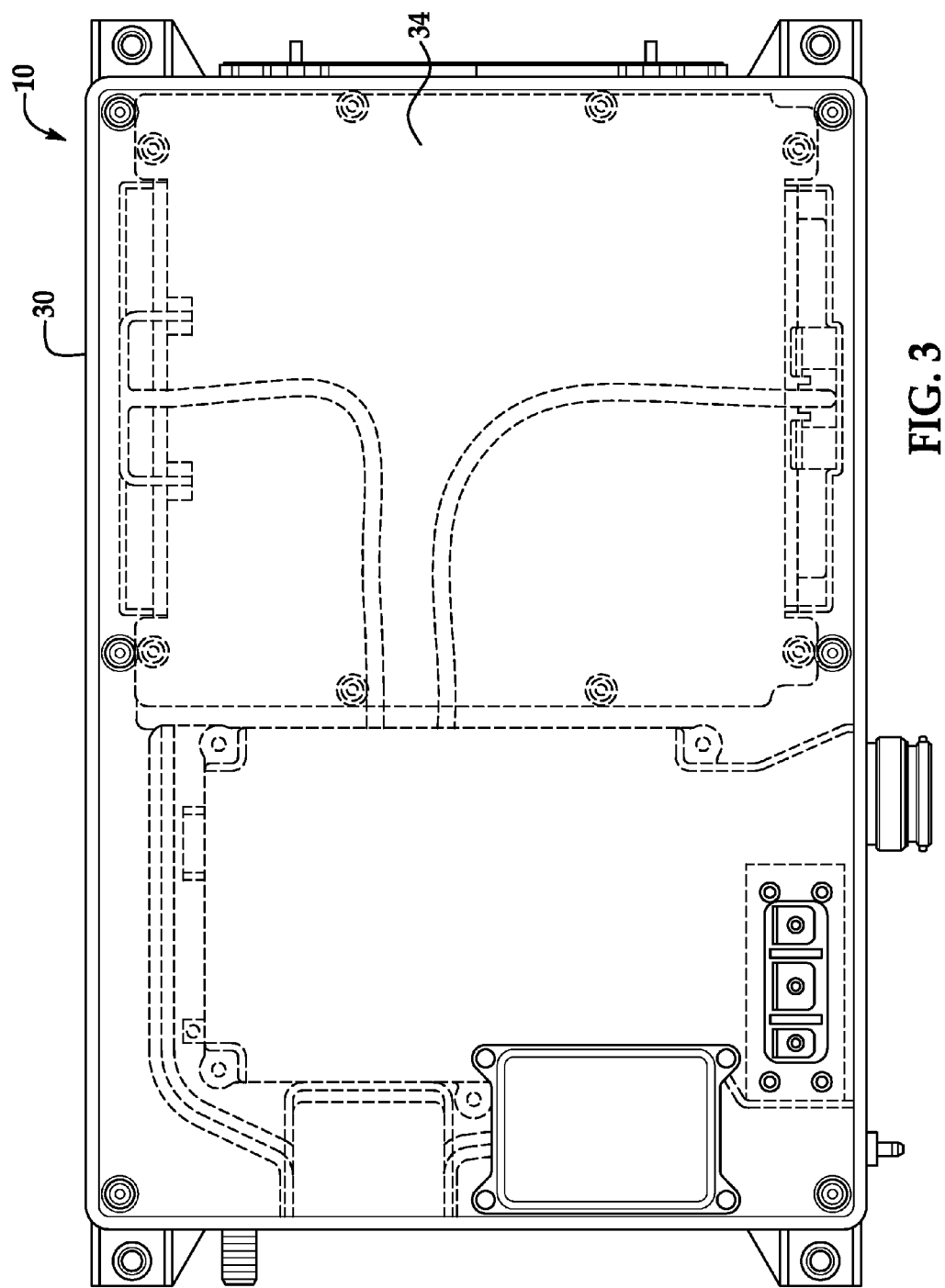
FIG. 3 is a partially transparent top view of the battery pack of FIG. 1.
Figure 4:
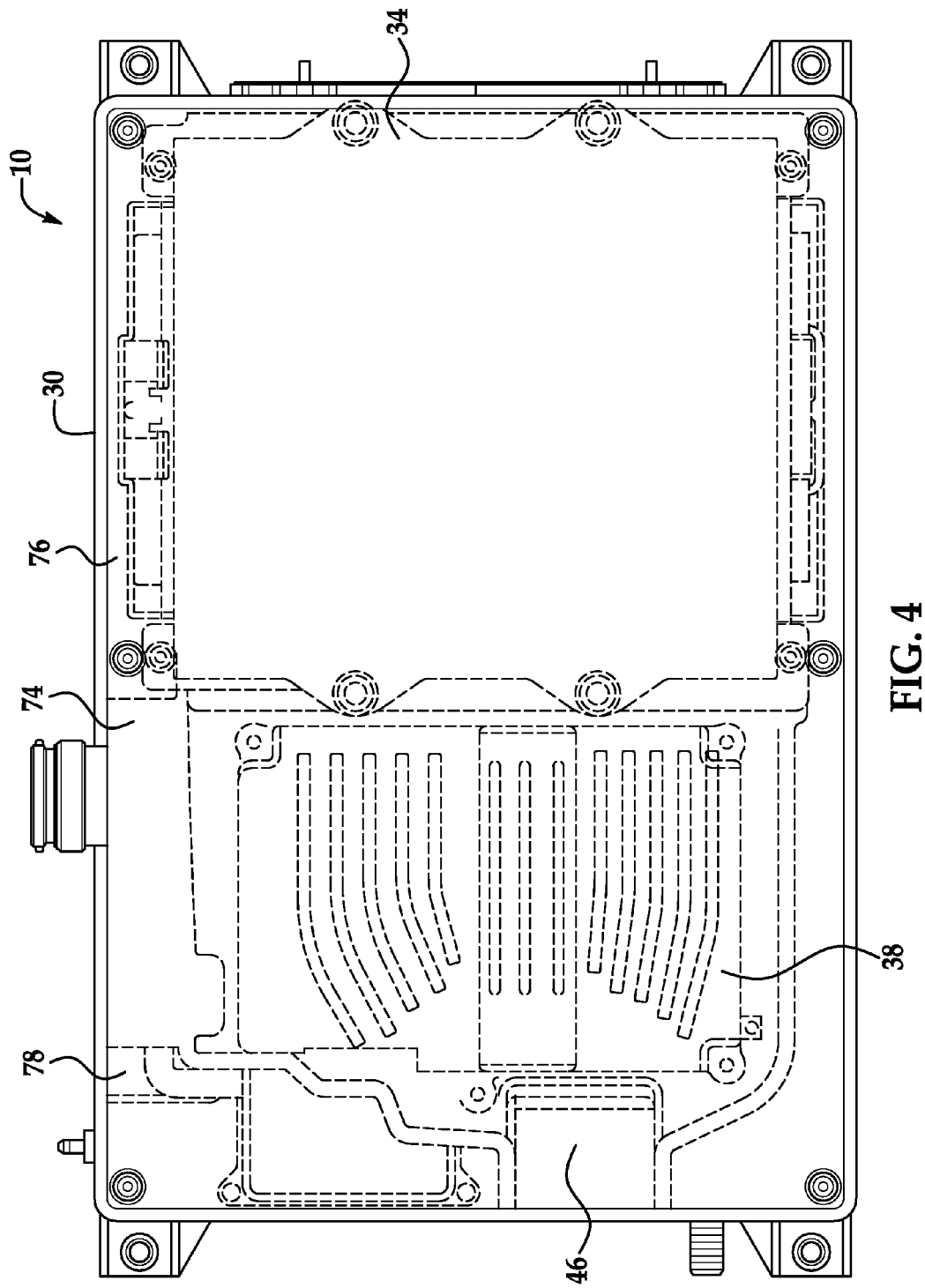
FIG. 4 is a partially transparent bottom view of the battery pack of FIG. 1.

Referring to FIGS. 1-6 and 29, a battery pack 10 in accordance with an exemplary embodiment is provided. The battery pack 10 includes a battery pack housing 30, a battery module 34, a thermally conductive housing 38, a DC-DC voltage converter 42, an electric fan 46, a first temperature sensor 48, a second temperature sensor 50, a power level sensor 52, and a microprocessor. An advantage of the battery pack 10 is that the battery pack 10 has the battery module 34 with end plates 230, 232 that extend past internal battery cells to direct air into heat exchangers contacting the battery cells. Thus, the battery pack 10 does not need a separate air manifold to direct air into heat exchangers contacting the battery cells. The battery pack 10 has a microprocessor 54 which monitors a temperature level of at least one battery cell, a temperature level of the DC-DC voltage converter, and a power level being output by the DC-DC voltage converter 42. The microprocessor 54 advantageously determines a first fan speed percentage value of an electric fan 46 based on the temperature level of at least one battery cell, a second fan speed percentage value of the electric fan 46 based on the temperature level of the DC-DC voltage converter, and a third fan speed percentage value of the electric fan 46 based on the power level being output by the DC-DC voltage converter 42, and selects the highest fan speed percentage value of the first, second, and third fan speed percentage values for controlling the electric fan 46. The term "percentage value" means a numerical value representing a percentage. For example, a percentage value can correspond to 50 which indicates 50 percent. Further, for example, a percentage value can correspond to 0.5 representing 50 percent.

Figure 5:
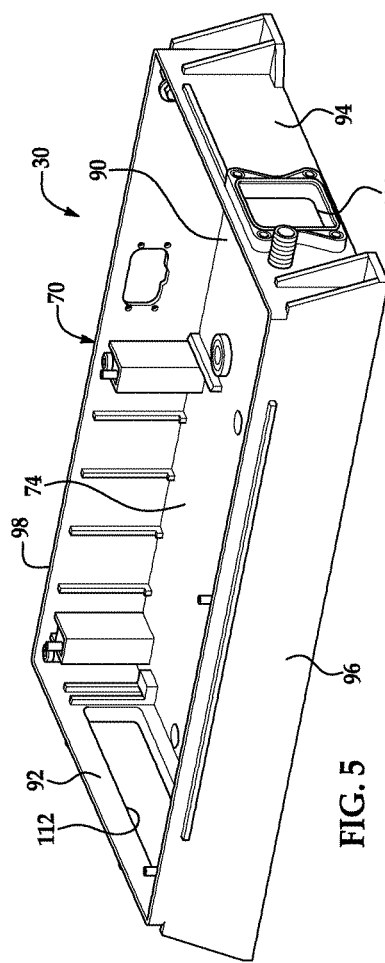
FIG. 5 is a schematic of a base portion of a battery pack housing utilized in the battery pack of FIG. 1.

Referring to FIGS. 1, 2 and 5, the battery pack housing 30 is provided to hold the remaining components of the battery pack 10 therein. The battery pack housing 30 has a base portion 70 and an upper cover 72 which define an interior region 74. The interior region 74 includes a first interior space 76 and a second interior space 78.

Referring to FIG. 5, the base portion 70 includes a bottom wall 90 and side walls 92, 94, 96, 98. The side walls 92, 94, 96, 98 are coupled to the bottom wall 90 and extend upwardly substantially perpendicular to the bottom wall 90. The side walls 92, 94 extend substantially parallel to one another. Further, the side walls 96, 98 extend substantially parallel to one another and perpendicular to the side walls 92, 94. The side wall 92 includes an inlet aperture 112 extending therethrough, and the side wall 94 includes an outlet aperture 114 extending therethrough. In an exemplary embodiment, the base portion 70 is constructed of steel or aluminum. In an alternative embodiment, the base portion 70 is constructed of plastic.

The upper cover 72 is removably coupled to the side walls 92, 94, 96, 98 to enclose the interior region 74. In an exemplary embodiment, the upper cover 72 is constructed of steel or aluminum. In an alternative embodiment, the upper cover 72 is constructed of plastic.

Referring to FIGS. 5-11, the battery module 34 is disposed in the first interior space 76 of the interior region 74 of the battery pack housing 30 proximate to the inlet aperture 112. The battery module 34 includes frame members 120, 124, 128, an insulating layer 140, battery cells 150, 154, 158, 162, 166, 170, 180, 184, 188, 192, 196, 200, battery cell interconnect assemblies 220, 222, and end plates 230, 232.

Figure 7:
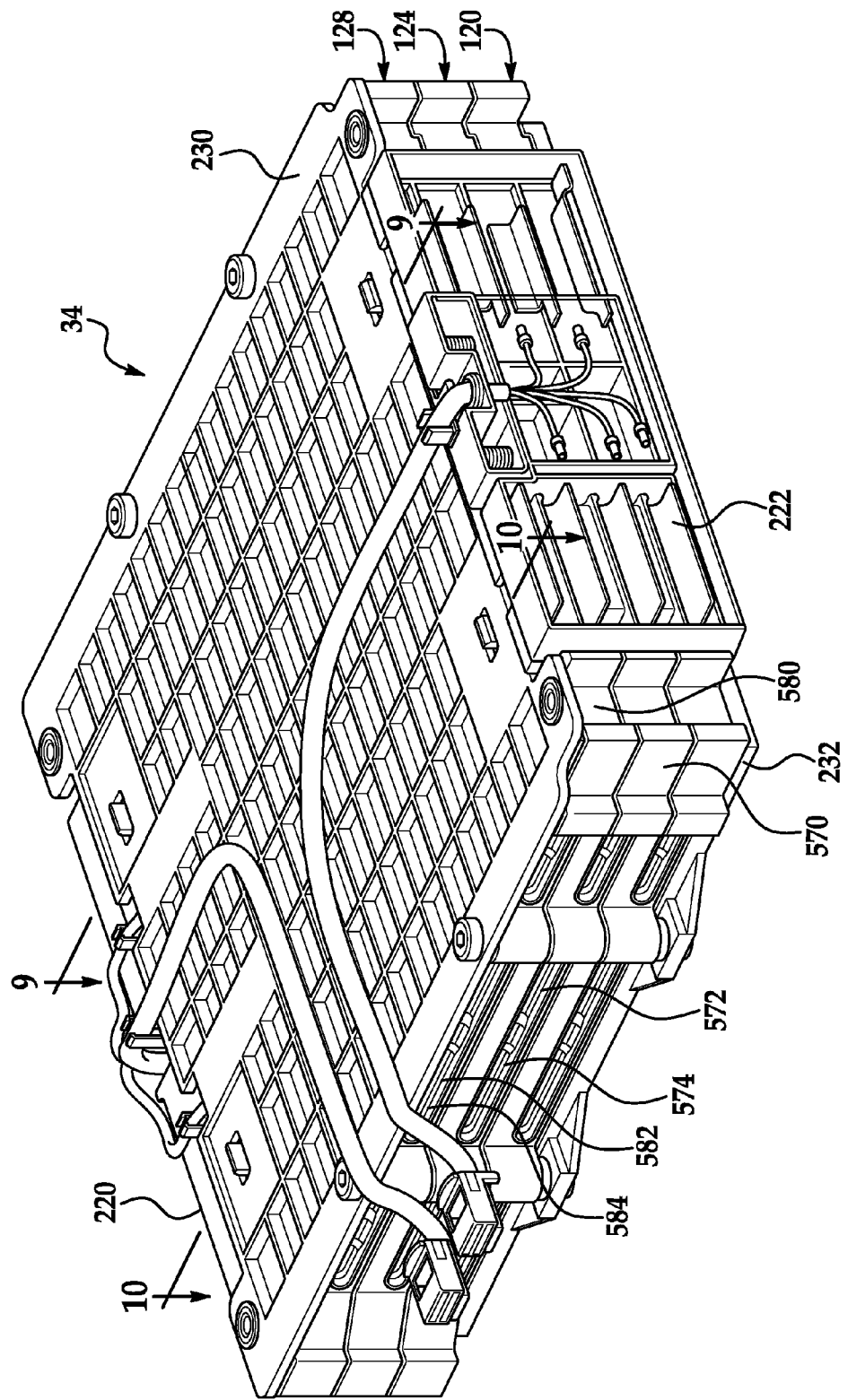
FIG. 7 is a schematic of a battery module utilized in the battery pack of FIG. 1.
Figure 8:
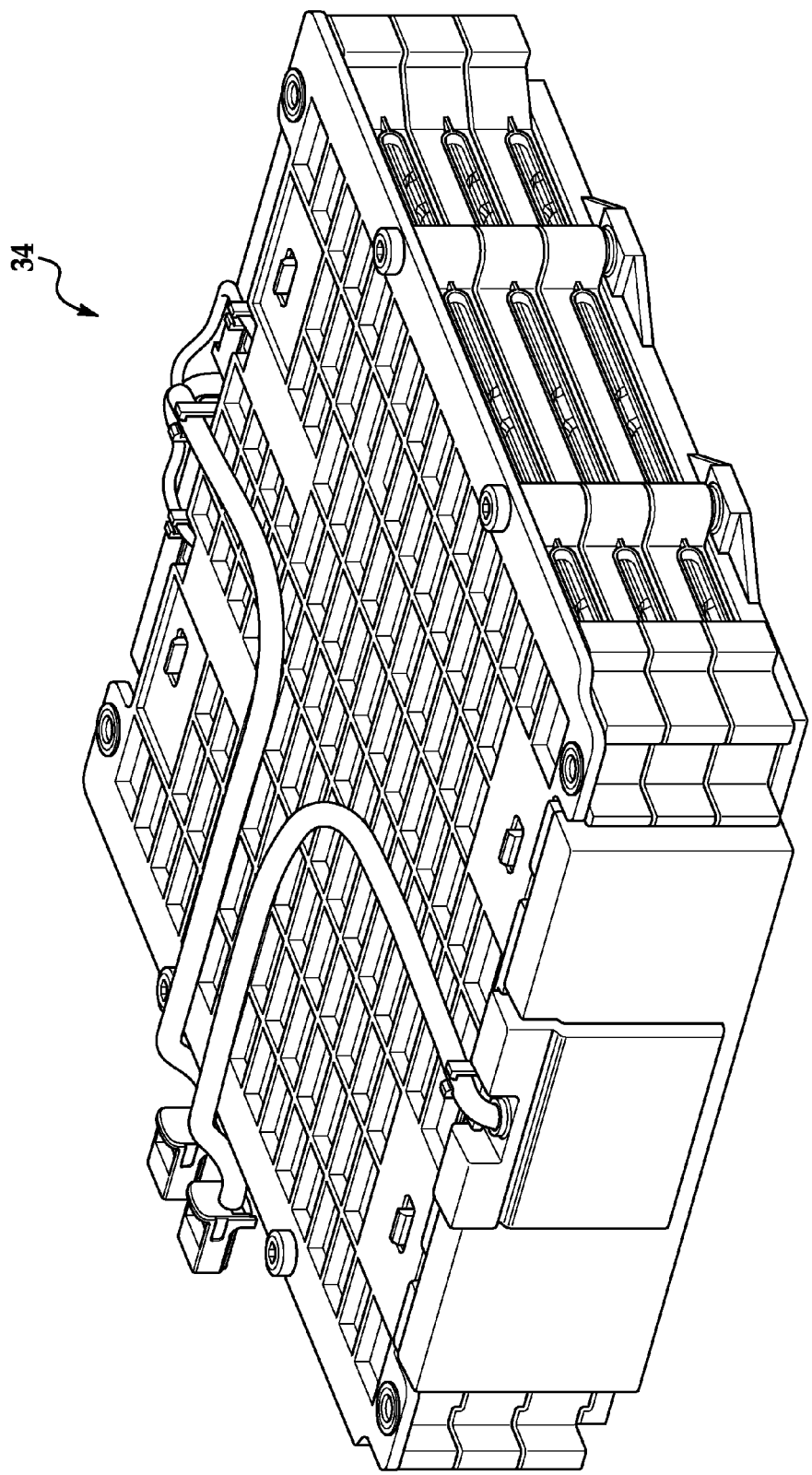
FIG. 8 is another schematic of the battery module of FIG. 7.

Referring to FIGS. 7, 9, and 10, the frame members 120, 124, 128 are provided to hold the battery cells 150-200 therebetween. The frame member 124 is coupled to and between the frame members 120, 128. The structure of each of the frame members 120, 124, 128 are identical to one another. Accordingly, only the structure of the frame member 120 will be described in detail below.

Figure 15:
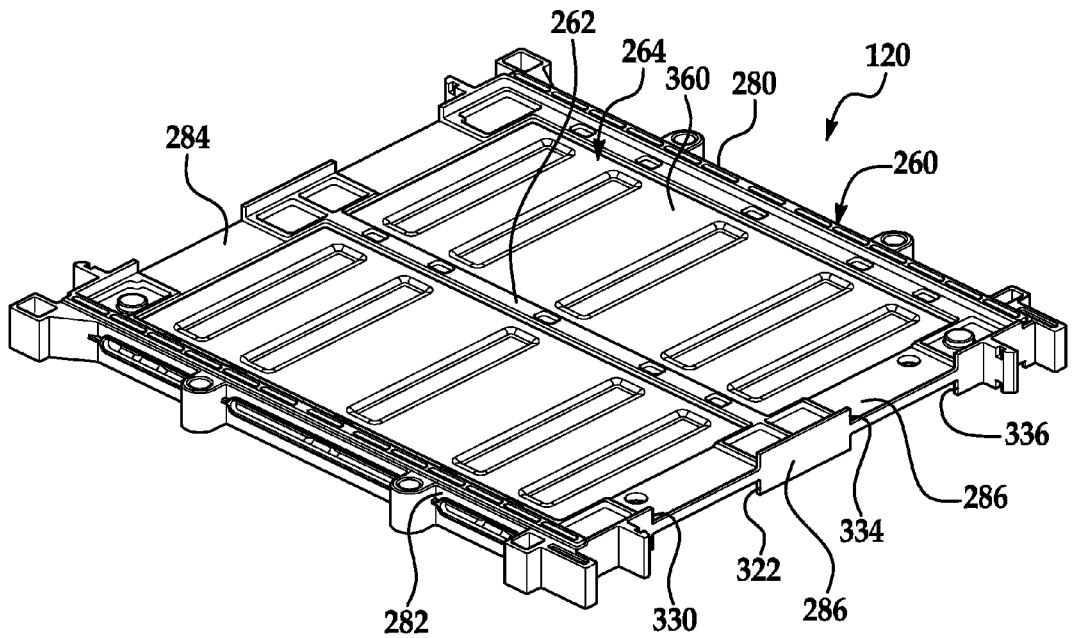
FIG. 15 is another schematic of the frame member of FIG. 14.
Figure 16:
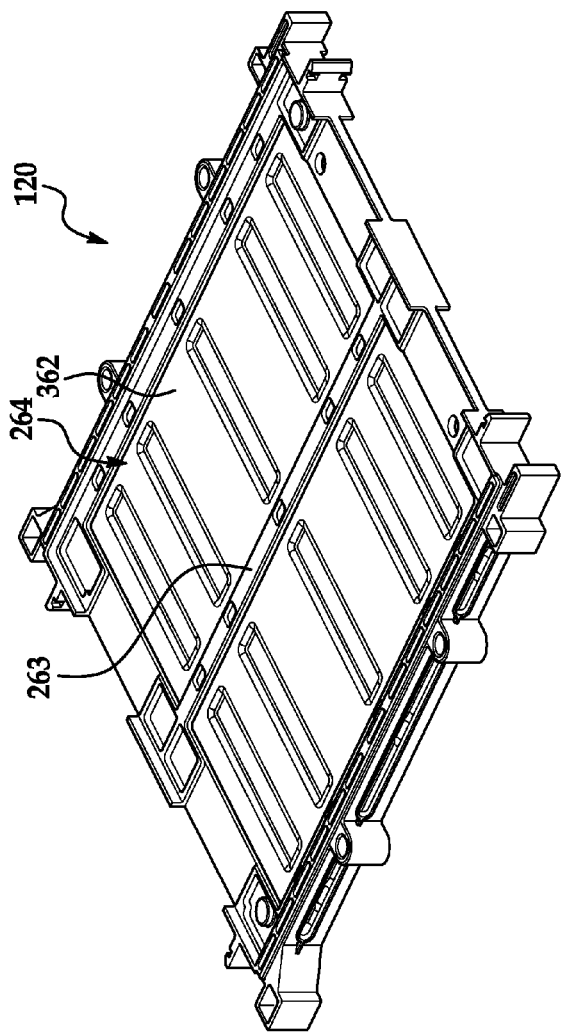
FIG. 16 is another schematic of the frame member of FIG. 15.
Figure 17:
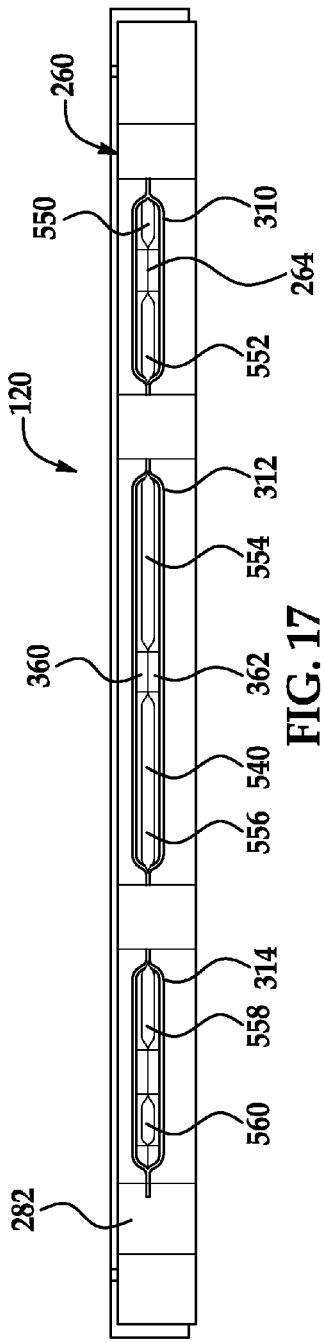
FIG. 17 is a side view of the frame member of FIG. 15 illustrating an end of a heat exchanger.
Figure 18:
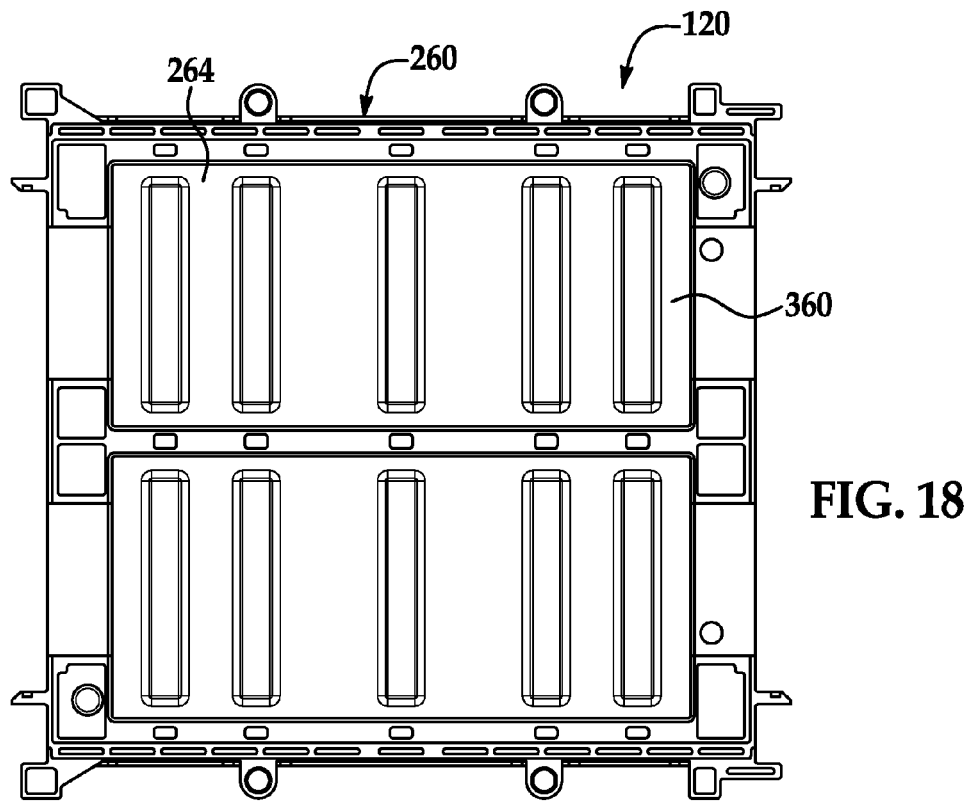
FIG. 18 is a schematic of a first side of the frame member of FIG. 15.
Figure 19:
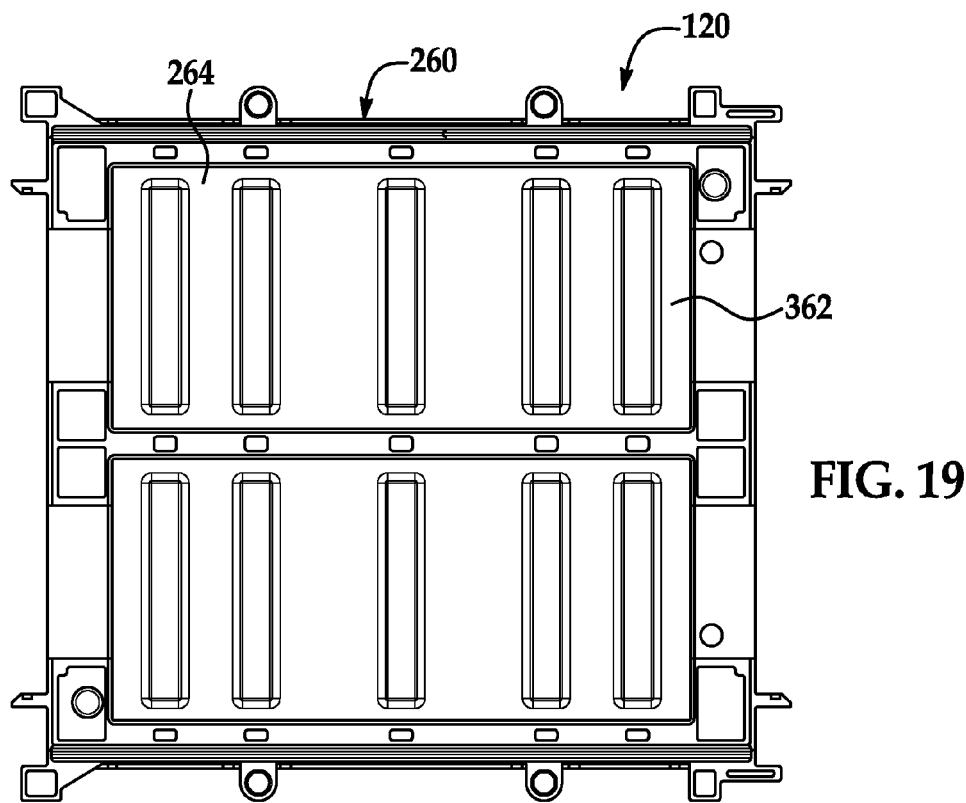
FIG. 19 is a schematic of a second side of the frame member of FIG. 15.

Referring to FIGS. 14-21, the frame member 120 has a substantially rectangular ring-shaped outer plastic frame 260, central plastic walls 262, 263, and a heat exchanger 264. The heat exchanger 264 has first and second thermally conductive plates 360, 362 that are coupled together and define a flow path portion 540 that extends therethrough. Referring to FIG. 17, the flow path portion 540 has flow path subportions 550, 552, 554, 556, 558, 560 each extending through the first and second thermally conductive plates 360, 362.

Figure 14:
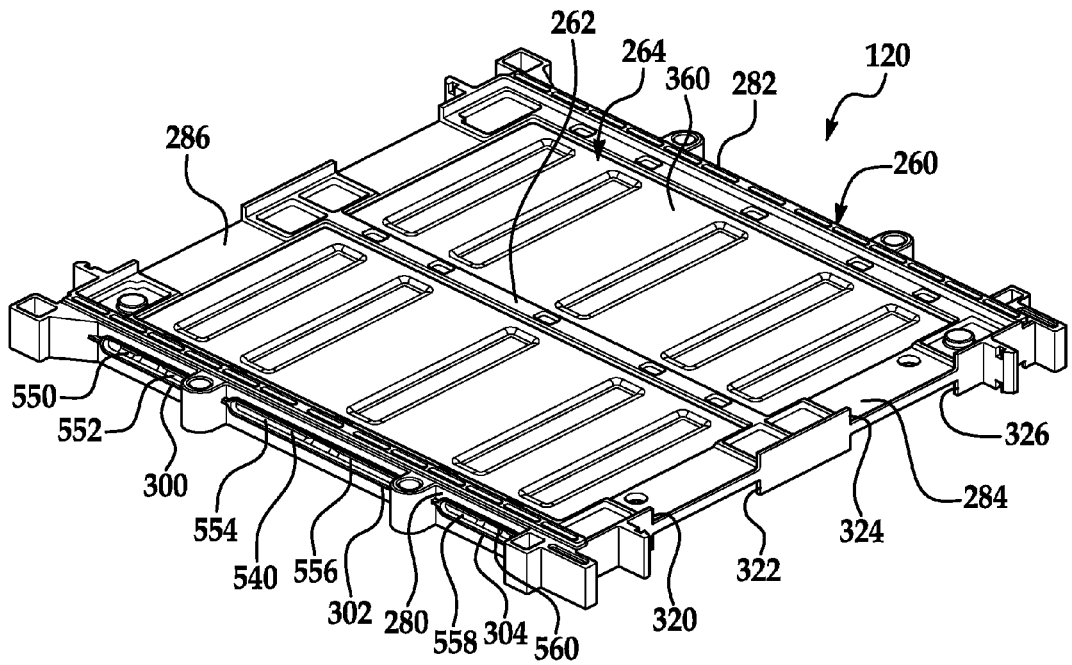
FIG. 14 is a schematic of a frame member utilized in the battery module of FIG. 7.

Referring to FIGS. 14-16, the substantially rectangular ring-shaped outer plastic frame 260 is coupled around an outer peripheral region of the first and second thermally conductive plates 360, 362. The first substantially rectangular ring-shaped outer plastic frame 260 has first, second, third, and fourth side walls 280, 282, 284, 286. The first and second side walls 280, 282 extend substantially parallel to one another. The third and fourth side walls 284, 286 are coupled between the first and second side walls 280, 282 and extend substantially parallel to one another and perpendicular to the first and second side walls 280, 282.

The central plastic wall 262 extends between the third and fourth side walls 284, 286 substantially parallel to the first and second side walls 280, 282. The central plastic wall 262 is disposed on a portion of the first side 380 (shown in FIG. 20) of the thermally conductive plate 360 of the heat exchanger 264.

The central plastic wall 263 extends between the third and fourth side walls 284, 286 substantially parallel to the first and second side walls 280, 282. The central plastic wall 263 is disposed on a portion of the first side 480 (shown in FIG. 22) of the thermally conductive plate 362 of the heat exchanger 264.

The first, third, and fourth side walls 280, 284, 286 and the central plastic wall 262 define a region for receiving a battery cell therein. The second, third, and fourth side walls 282, 284, 286 define a region for receiving another battery cell therein.

The first side wall 280 has apertures 300, 302, 304 extending therethrough. The aperture 300 fluidly communicates with the flow path subportions 550, 552. Also, the aperture 302 fluidly communicates with the flow path subportions 554, 556. Further, the aperture 304 fluidly communicates with the flow path subportions 558, 560.

Referring to FIG. 17, the second side wall 282 has apertures 310, 312, 314 extending therethrough. The aperture 310 fluidly communicates with the flow path subportions 550, 552. Also, the aperture 312 fluidly communicates with the flow path subportions 554, 556. Further, the aperture 314 fluidly communicates with the flow path subportions 558, 560.

Referring to FIGS. 14 and 15, the third side wall 284 has grooves 320, 322, 324, 326 extending therein. The fourth side wall 286 has grooves 330, 332, 334, 336 extending therein. The grooves 320, 330 are configured to receive first and second electrical terminals of a battery cell therethrough. Further, the grooves 324, 334 are configured to receive first and second electrical terminals of another battery cell therethrough. Still further, the grooves 322, 332 are configured to receive first and second electrical terminals of another battery cell therethrough. Finally, the grooves 326, 336 are configured to receive first and second electrical terminals of another battery cell therethrough.

Figure 20:
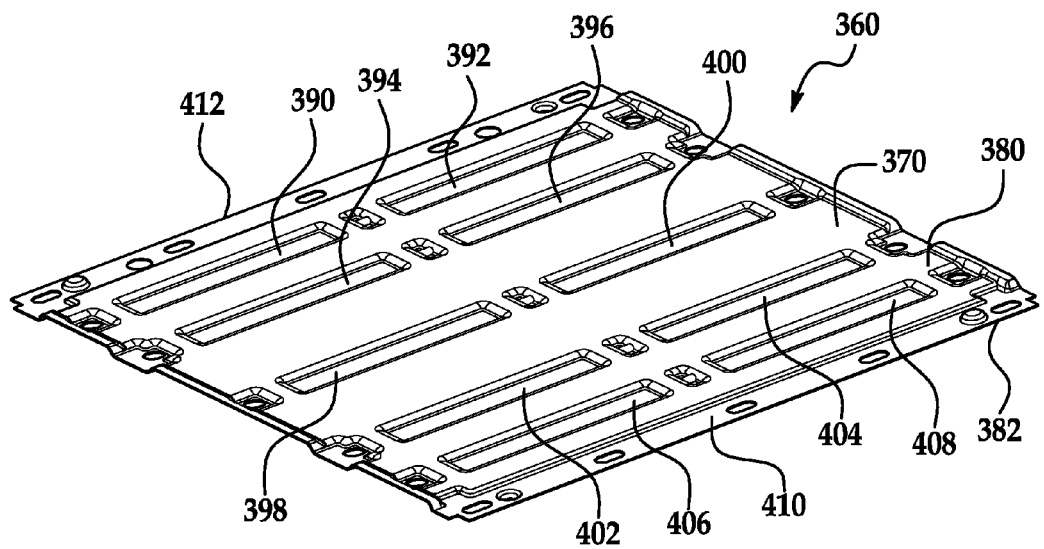
FIG. 20 is a schematic of a first side of a first thermally conductive plate utilized in a heat exchanger in the frame member of FIG. 15.
Figure 21:
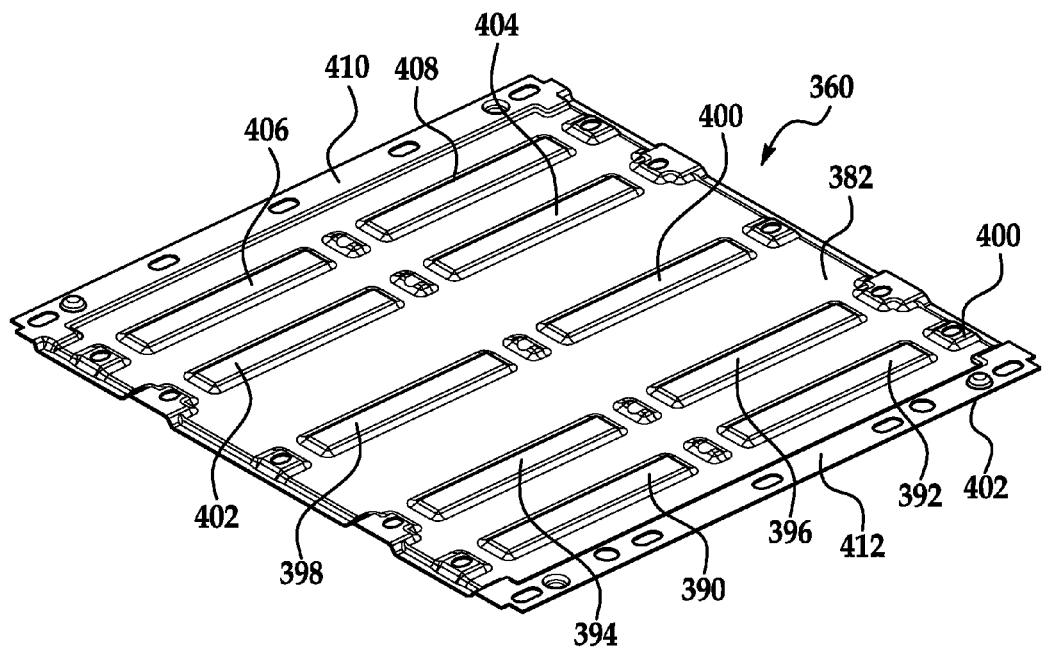
FIG. 21 is a schematic of a second side of the first thermally conductive plate of FIG. 20.
Figure 22:
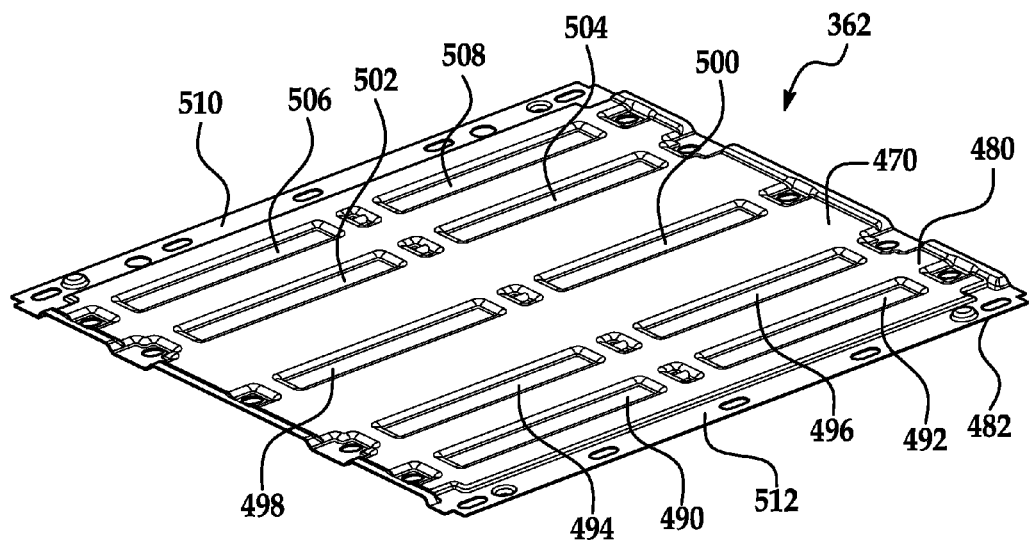
FIG. 22 is a schematic of a first side of a second thermally conductive plate utilized in a heat exchanger in the frame member of FIG. 15.

Referring to FIGS. 20-22, the heat exchanger 264 includes first and second thermally conductive plates 360, 362 that are coupled together and define the flow path portion 540 extending completely through the plates 360, 362.

The first thermally conductive plate 360 includes a sheet portion 370 having a first side 380 and a second side 382. The sheet portion 370 includes elongated depressed portions 390, 392, 394, 396, 398, 400, 402, 404, 406, 408, and depressed edge portions 410, 412. In an exemplary embodiment, the sheet portion 370 is constructed of aluminum and is substantially rectangular-shaped.

The second thermally conductive plate 362 includes a sheet portion 470 having a first side 480 and a second side 482. The sheet portion 470 includes elongated depressed portions 490, 492, 494, 496, 498, 500, 502, 504, 506, 508, and depressed edge portions 510, 512. In an exemplary embodiment, the sheet portion 470 is constructed of aluminum and is substantially rectangular-shaped.

The first thermally conductive plate 360 is coupled to the second thermally conductive plate 362 such that the elongated depressed portions 390, 392, 394, 396, 398, 400, 402, 404, 406, 408 contact and are coupled to the elongated depressed portions 490, 492, 494, 496, 498, 500, 502, 504, 506, 508, respectively and the depressed edge portions 410, 412 contact and are coupled to the depressed edge portions 510, 512. The plates 360, 362 define the flow path portion 540 having the flow path subportions 550, 552, 554, 556, 558, 560 that extending entirely through a longitudinal length of the plates 360, 362.

Referring to FIG. 7, the frame member 124 has an identical structure as the frame member 120 described above. The frame member 124 has a substantially rectangular ring-shaped outer plastic frame 570, first and second central plastic walls (not shown), and a heat exchanger 572.

The frame member 128 has an identical structure as the frame member 120 described above. The frame member 128 has a substantially rectangular ring-shaped outer plastic frame 580, first and second central plastic walls (not shown), and a heat exchanger 582.

Figure 6:
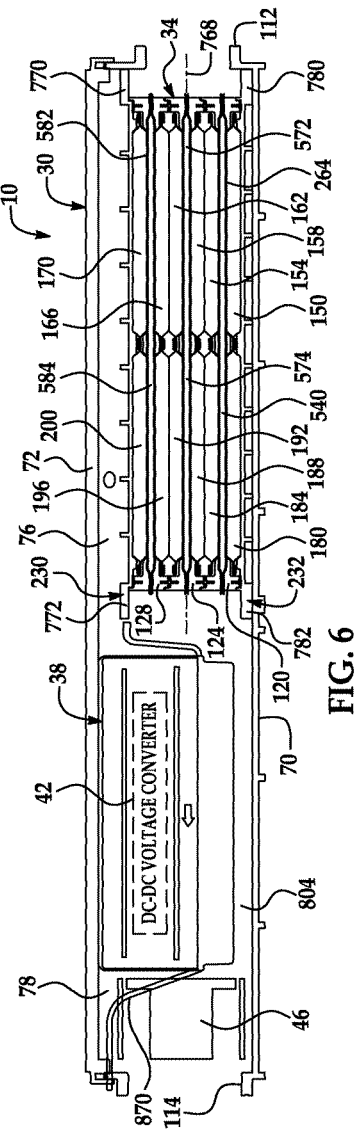
FIG. 6 is a cross-sectional schematic of the battery pack of FIG. 1.

Referring to FIGS. 6, 9 and 10, the frame member 120 and the end plate 232 are configured to hold the battery cells 150, 180 therebetween. Further, the heat exchanger 264 of the frame member 120 is disposed between and contacts the battery cells 150, 154. Also, the heat exchanger 264 is disposed between and contacts the battery cells 180, 184.

The frame members 120, 124 are configured to hold the battery cells 154, 158 therebetween. Further, the frame members 120, 124 are configured to hold the battery cells 184, 188 therebetween. The heat exchanger 572 of the frame member 124 is disposed between and contacts the battery cells 158, 162. Also, the heat exchanger 572 is disposed between and contacts the battery cells 188, 192.

The frame members 124, 128 are configured to hold the battery cells 162, 166 therebetween. Further, the frame members 124, 128 are configured to hold the battery cells 192, 196 therebetween. The heat exchanger 582 of the frame member 128 is disposed between and contacts the battery cells 166, 170. Also, the heat exchanger 582 is disposed between and contacts the battery cells 196, 200.

The frame member 128 and the insulating layer 140 (shown in FIG. 9) are configured to hold the battery cells 170, 200 therebetween. The heat exchanger 582 of the frame member 128 is disposed against the battery cells 170, 200. The end plate 230 is coupled to the frame member 128 such that the insulating layer 140 is disposed between the frame member 128 and the battery cells 170, 200.

The battery cells 150, 154, 158, 162, 166, 170, 180, 184, 188, 192, 196, 200 are each configured to generate an operational voltage. In one exemplary embodiment, the battery cells 150-200 are pouch-type lithium-ion battery cells that have a substantially rectangular-shaped body portion and a pair of electrical terminals. In an exemplary embodiment, the battery cells 150-200 are electrically coupled in series with one another utilizing interconnect members on the battery cell interconnect and voltage sensing assemblies 220, 222. Further, in an exemplary embodiment, the electrical terminals of the battery cells 150-200 are coupled to corresponding interconnect members by ultrasonically welding the electrical terminals of the battery cells 150-200 to the corresponding interconnect members utilizing an ultrasonic welding machine. The structure of the battery cells 150-200 are identical to one another.

Referring to FIG. 9, the battery cell 150 has a rectangular-shaped housing 640 with electrical terminals 642, 644, extending from first and second ends, respectively, of the housing 640. The electrical terminal 642 is electrically and physically coupled to the battery cell interconnect and voltage sensing assembly 220. The electrical terminal 644 is electrically and physically coupled to the battery cell interconnect and voltage sensing assembly 222.

The battery cell 154 has a rectangular-shaped housing 650 with electrical terminals 652, 654, extending from first and second ends, respectively, of the housing 650. The electrical terminal 652 is electrically and physically coupled to the battery cell interconnect and voltage sensing assembly 220. The electrical terminal 654 is electrically and physically coupled to the battery cell interconnect and voltage sensing assembly 222.

The battery cell 158 has a rectangular-shaped housing 660 with electrical terminals 662, 664, extending from first and second ends, respectively, of the housing 660. The electrical terminal 662 is electrically and physically coupled to the battery cell interconnect and voltage sensing assembly 220. The electrical terminal 664 is electrically and physically coupled to the battery cell interconnect and voltage sensing assembly 222.

The battery cell 162 has a rectangular-shaped housing 670 with electrical terminals 672, 674, extending from first and second ends, respectively, of the housing 670. The electrical terminal 672 is electrically and physically coupled to the battery cell interconnect and voltage sensing assembly 220. The electrical terminal 674 is electrically and physically coupled to the battery cell interconnect and voltage sensing assembly 222.

The battery cell 166 has a rectangular-shaped housing 680 with electrical terminals 682, 684, extending from first and second ends, respectively, of the housing 680. The electrical terminal 682 is electrically and physically coupled to the battery cell interconnect and voltage sensing assembly 220. The electrical terminal 684 is electrically and physically coupled to the battery cell interconnect and voltage sensing assembly 222.

The battery cell 170 has a rectangular-shaped housing 690 with electrical terminals 692, 694, extending from first and second ends, respectively, of the housing 690. The electrical terminal 692 is electrically and physically coupled to the battery cell interconnect and voltage sensing assembly 220. The electrical terminal 694 is electrically and physically coupled to the battery cell interconnect and voltage sensing assembly 222.

The series combination of the battery cells 150-170 are electrically coupled in series with the series combination of the battery cells 180-200 utilizing an elongated interconnect member.

Referring to FIG. 10, the battery cell 180 has a rectangular-shaped housing 700 with electrical terminals 702, 704 extending from first and second ends, respectively, of the housing 700. The electrical terminal 702 is electrically and physically coupled to the battery cell interconnect and voltage sensing assembly 220. The electrical terminal 704 is electrically and physically coupled to the battery cell interconnect and voltage sensing assembly 222.

The battery cell 184 has a rectangular-shaped housing 710 with electrical terminals 712, 714 extending from first and second ends, respectively, of the housing 710. The electrical terminal 712 is electrically and physically coupled to the battery cell interconnect and voltage sensing assembly 220. The electrical terminal 714 is electrically and physically coupled to the battery cell interconnect and voltage sensing assembly 222.

The battery cell 188 has a rectangular-shaped housing 720 with electrical terminals 722, 724 extending from first and second ends, respectively, of the housing 720. The electrical terminal 722 is electrically and physically coupled to the battery cell interconnect and voltage sensing assembly 220. The electrical terminal 724 is electrically and physically coupled to the battery cell interconnect and voltage sensing assembly 222.

The battery cell 192 has a rectangular-shaped housing 730 with electrical terminals 732, 734 extending from first and second ends, respectively, of the housing 730. The electrical terminal 732 is electrically and physically coupled to the battery cell interconnect and voltage sensing assembly 220. The electrical terminal 734 is electrically and physically coupled to the battery cell interconnect and voltage sensing assembly 222.

The battery cell 196 has a rectangular-shaped housing 740 with electrical terminals 742, 744 extending from first and second ends, respectively, of the housing 740. The electrical terminal 742 is electrically and physically coupled to the battery cell interconnect and voltage sensing assembly 220. The electrical terminal 744 is electrically and physically coupled to the battery cell interconnect and voltage sensing assembly 222.

The battery cell 200 has a rectangular-shaped housing 750 with electrical terminals 752, 754 extending from first and second ends, respectively, of the housing 750. The electrical terminal 752 is electrically and physically coupled to the battery cell interconnect and voltage sensing assembly 220. The electrical terminal 754 is electrically and physically coupled to the battery cell interconnect and voltage sensing assembly 222.

Referring to FIG. 6, the end plates 230, 232 are provided to guide cooling air through the flow path portions 540, 574, 584 of the frame members 120, 124, 128, respectively. The end plates 230, 232 have the frame members 120-128 and the battery cells 150-200 disposed therebetween.

The end plate 230 extends substantially parallel to a longitudinal axis 768 of the battery module 34. The end plate 230 has a first end portion 770 and a second end portion 772. The first end portion 770 extends longitudinally past a first end of each of the battery cells 150-170 toward the inlet aperture 112. The second end portion 772 extends longitudinally past the second end of each of the battery cells 180-200.

The end plate 232 extends substantially parallel to the longitudinal axis 768 of the battery module 34. The end plate 232 has a first end portion 780 and a second end portion 782. The first end portion 780 extends longitudinally past a first end of each of the battery cells 150-170 toward the inlet aperture 112. The second end portion 782 extends longitudinally past the second end of each of the battery cells 180-200.

Referring to FIGS. 5, 6 and 23-26, the thermally conductive housing 38 is provided to hold the DC-DC voltage converter 42 therein that is electrically coupled to the battery cells of the battery module 34. The thermally conductive housing 38 transfers heat from the DC-DC voltage converter 42 to air flowing past the thermally conductive housing. The thermally conductive housing 38 is disposed in the second interior space 78 of the interior region 74 of the battery pack housing 30 between the battery module 34 and the outlet aperture 114 of the battery pack housing 30. The thermally conductive housing 38 defines a flow path portion 804 between the thermally conductive housing 38 and the battery pack housing 30. The flow path portion 804 fluidly communicates with the flow path portions 540, 574, 584 of the battery module 34 and with the outlet aperture 114.

The thermally conductive housing 38 includes a housing portion 800 and a frame member 802. The housing portion 800 includes bottom wall 810 and cooling fins 820, 822, 824, 826, 840, 842, 844, 846, 848 extending outwardly from the bottom wall 810 in a first direction. The cooling fins 820-848 are spaced apart from one another such that the flow path portion 804 is defined between the cooling fins 820-848. The cooling fins 820-848 are disposed on the bottom wall 90 (shown in FIG. 5) of the base portion 70. In an exemplary embodiment, the thermally conductive housing 38 is constructed of aluminum. Of course, in an alternative embodiment, the thermally conductive housing 38 can be constructed of other materials such as steel or other metal alloys for example.

Figure 23:
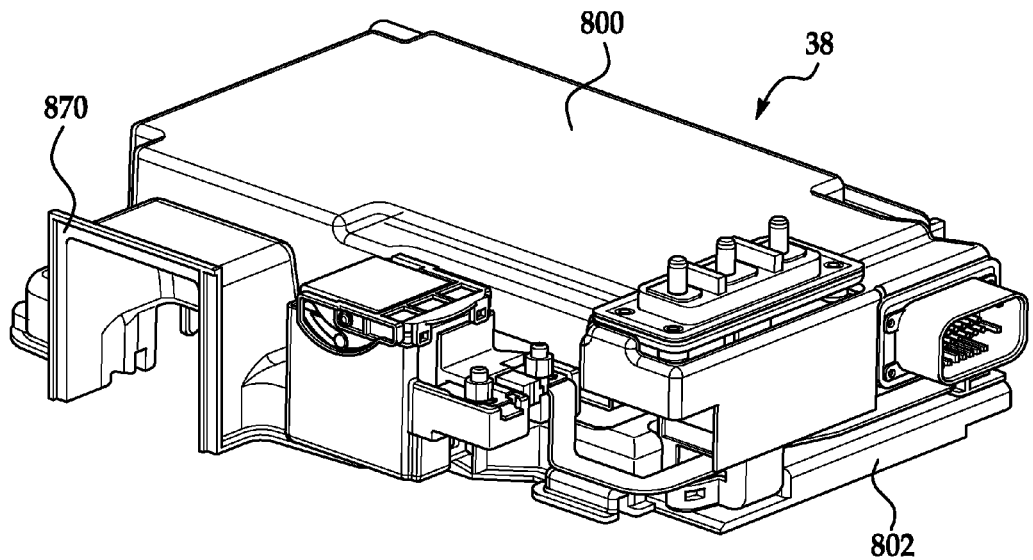
FIG. 23 is a schematic of a thermally conductive housing utilized in the battery pack of FIG. 1.
Figure 24:
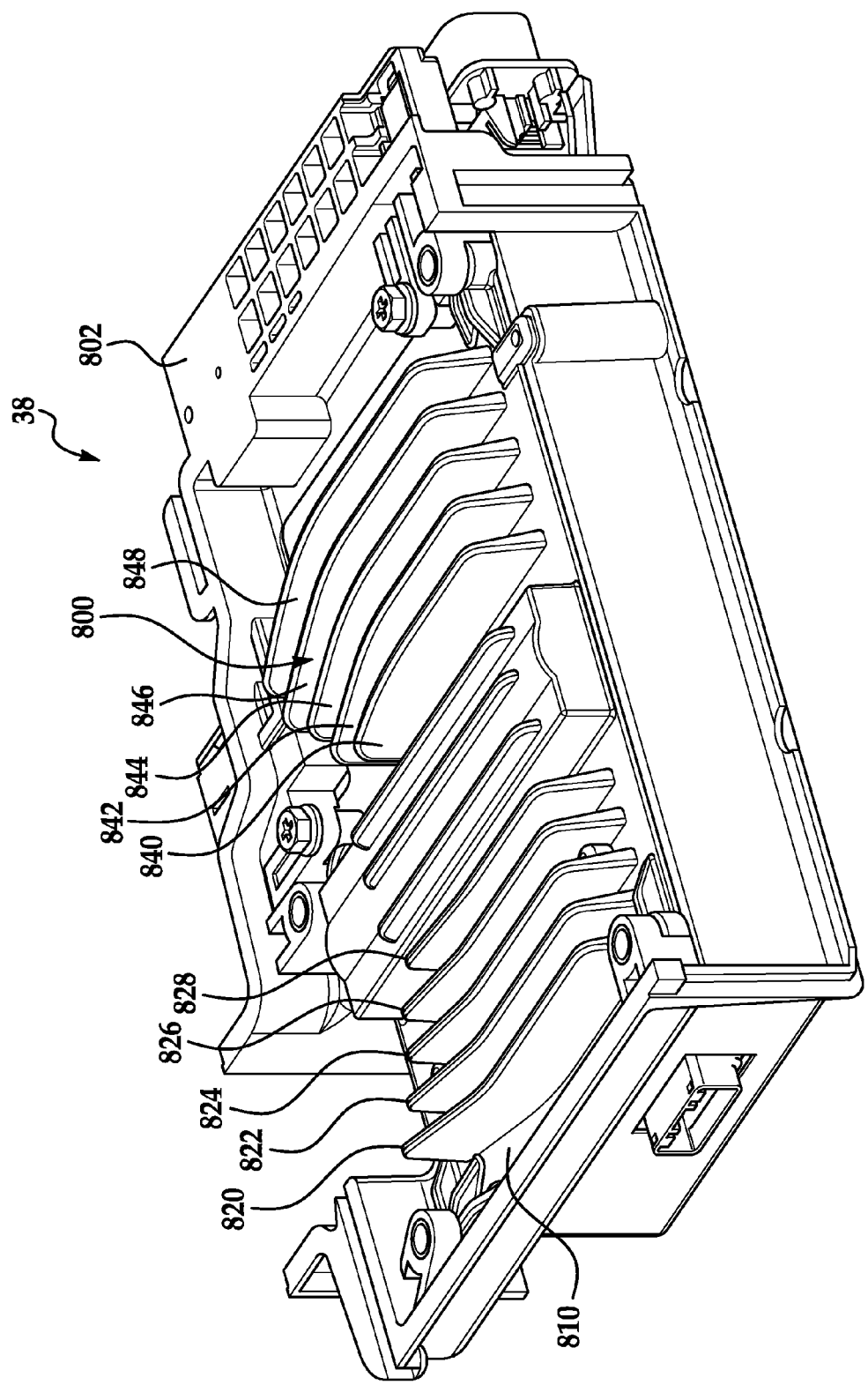
FIG. 24 is another schematic of the thermally conductive housing of FIG. 23.
Figure 25:
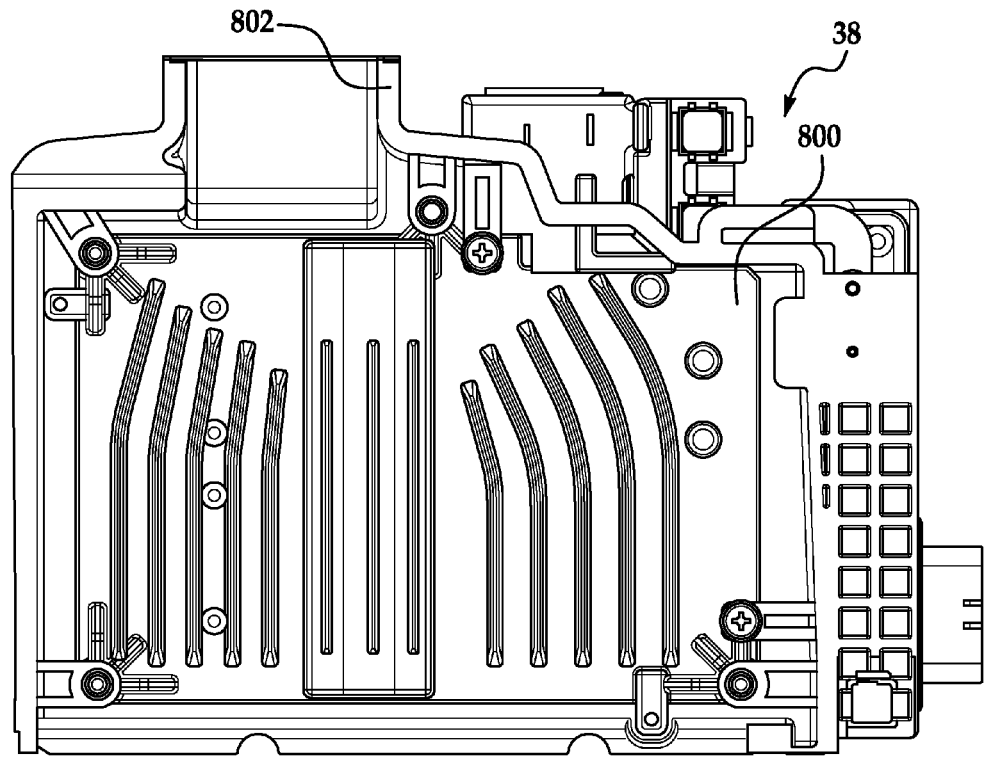
FIG. 25 is a schematic of a bottom side of the thermally conductive housing of FIG. 23.
Figure 26:
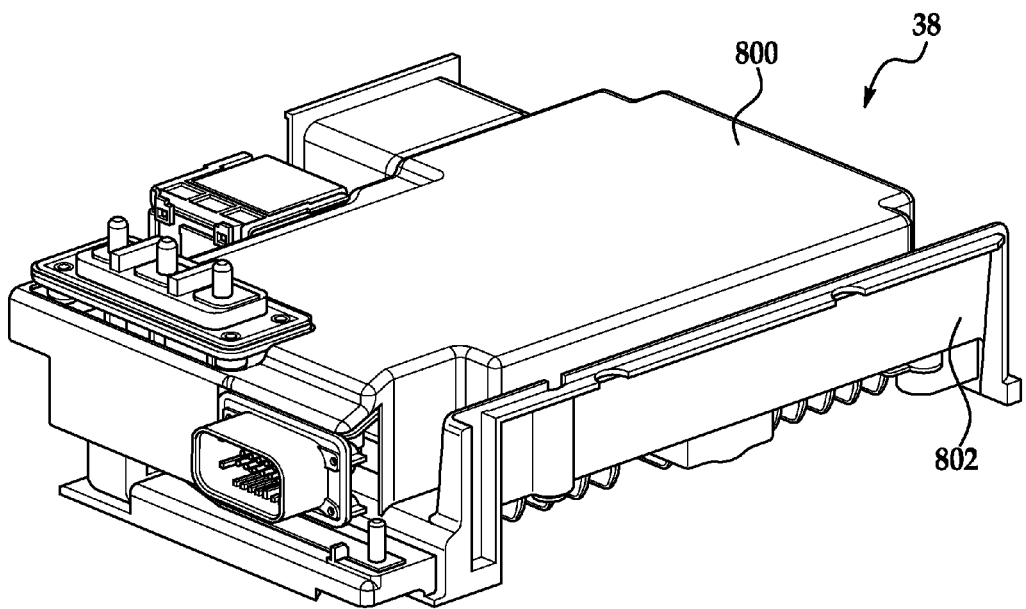
FIG. 26 is another schematic of the thermally conductive housing of FIG. 23.
Figure 27:
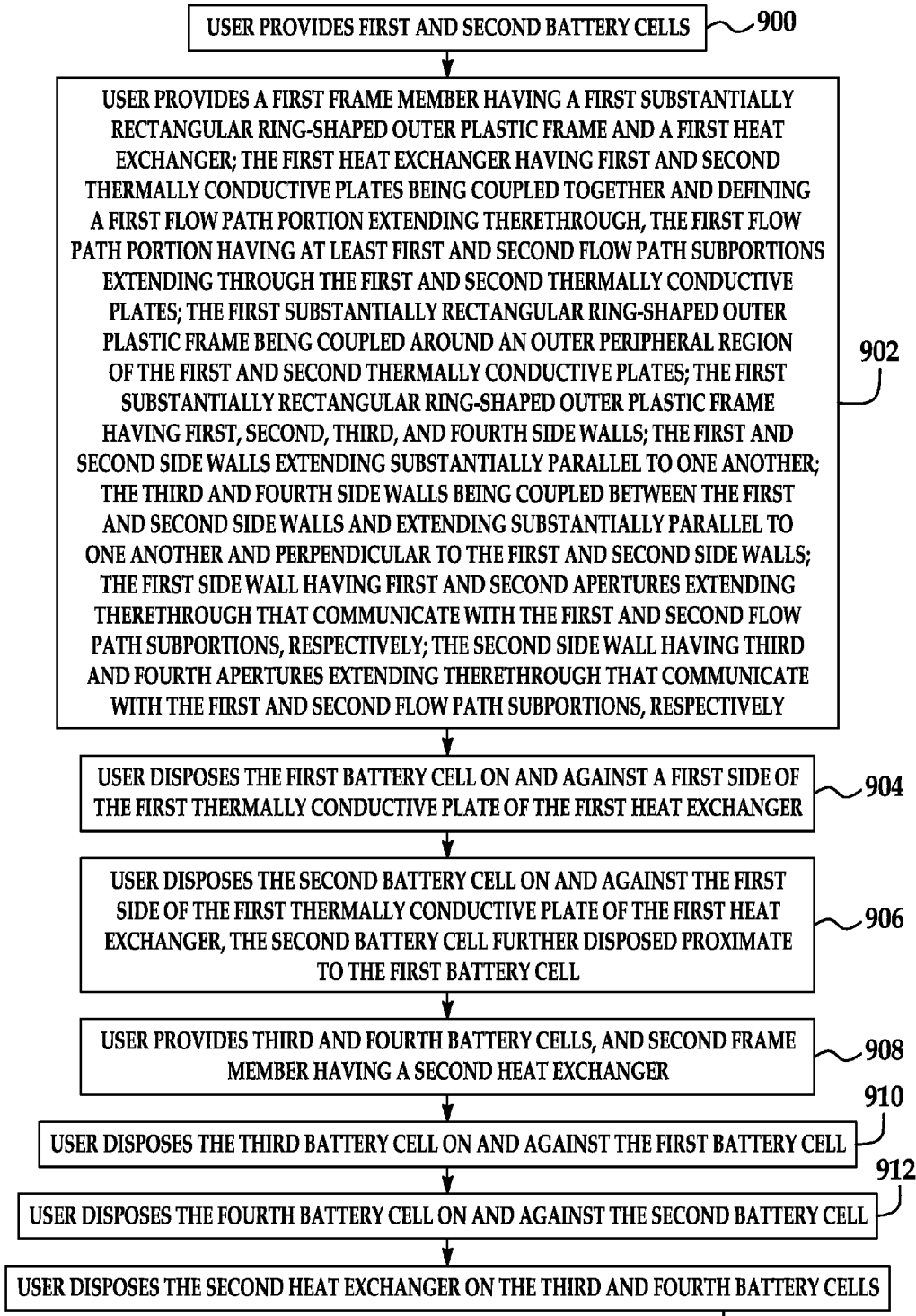
FIG. 27 is a flowchart of a method of assembling a battery module in accordance with another exemplary embodiment.

Referring to FIGS. 6 and 23, the frame member 802 is coupled to an exterior of the thermally conductive housing 38 and includes an outlet portion 870 that directs air toward the fan 46 and the outlet aperture 114 of the battery pack housing 30.

Referring to FIGS. 5 and 6, the electric fan 46 is disposed in the interior region 74 of the battery pack housing 30 proximate to the outlet aperture 114 of the battery pack housing 30. The electric fan 46 is adapted to urge air to flow through the inlet aperture 112 and through the flow path portions 540, 574, 584 of the battery module and the flow path portion 804 and further through a portion of the electric fan 46 and through the outlet aperture 114 of the battery pack housing 30. In an alternative embodiment, the electric fan 46 is disposed proximate to the inlet aperture 112.

Figures 29, 30:
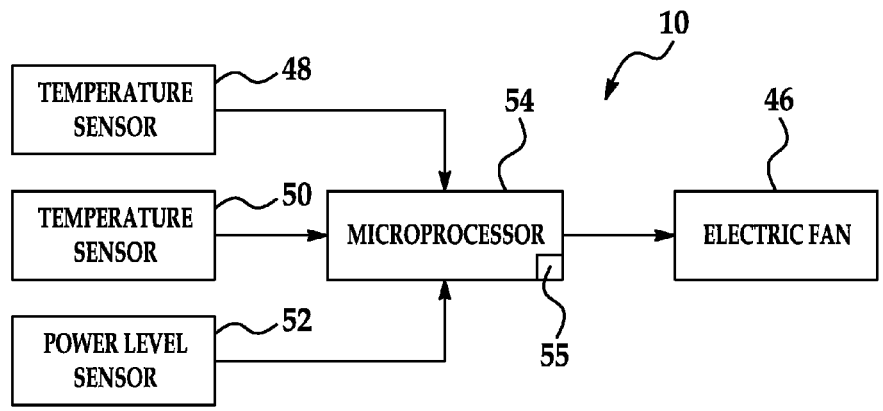
FIG. 29 is a block diagram of a portion of the battery pack of FIG. 1.
FIG. 30 is a first exemplary table utilized by the battery pack of FIG. 1.
Figure 31:
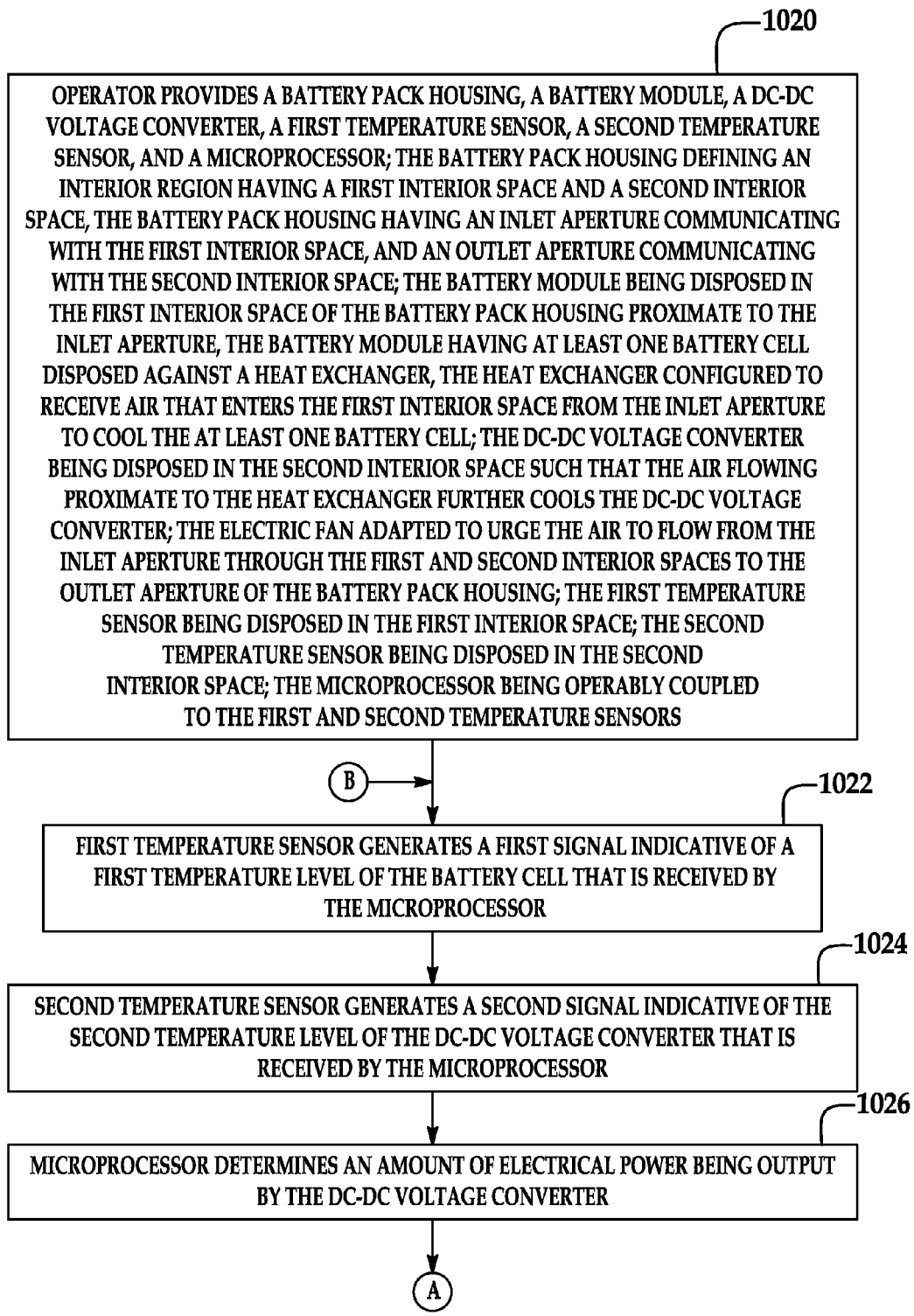
FIGS. 31-33 are flowcharts of a method for controlling operation of an electric fan in the battery pack of FIG. 1.
Figure 32:
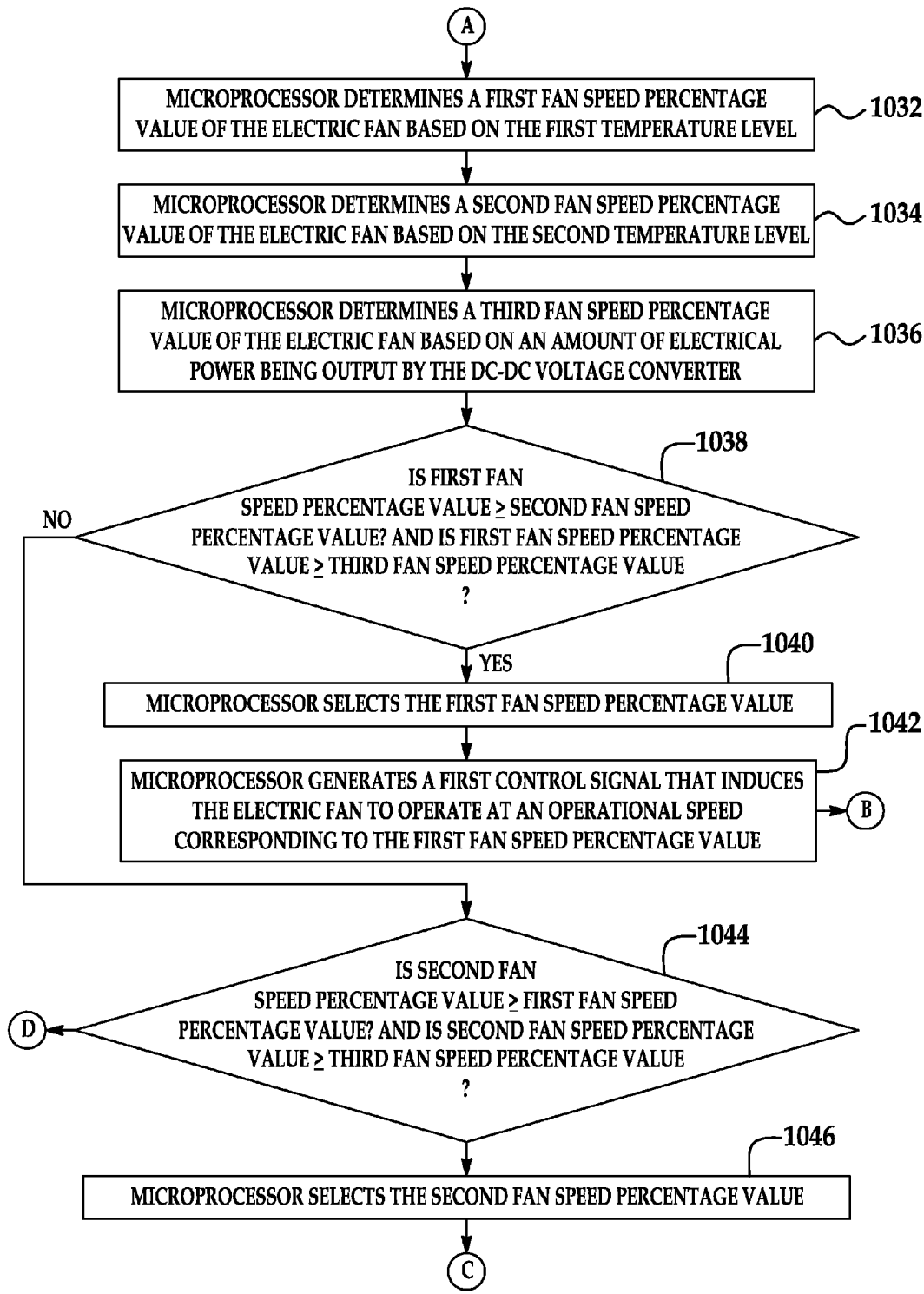

Referring to FIGS. 6 and 29, the first temperature sensor 48 is disposed in the first interior space 76 of the interior region 74 of the battery pack housing 30 proximate to at least one battery cell of the battery module 34. The first temperature sensor 48 is configured to generate a signal indicative of a temperature level of the at least one battery cell of the battery module 34.

The second temperature sensor 50 is disposed in the second interior space 78 of the interior region 74 of the battery pack housing 30 proximate to the DC-DC voltage converter 42. The second temperature sensor 50 is configured to generate a signal indicative of a temperature level of the DC-DC voltage converter 42.

The power level sensor 52 is electrically coupled to the DC-DC voltage converter 42 and to the microprocessor 54 such that the power level sensor 52 monitors an amount of power being output by the DC-DC voltage converter 42. The power level sensor 52 generates a signal indicative of the amount of power output by the DC-DC voltage converter 42 that is received by the microprocessor 54.

The microprocessor 54 is operably and electrically coupled to the first temperature sensor 48, the second temperature sensor 50, the power level sensor 52, and the electric fan 46. In an exemplary embodiment, the microprocessor 54 is programmed to receive a signal from the first temperature sensor 48, a signal from the second temperature sensor 50, a signal from the power level sensor 52, and controls operation of the electric fan 46 based on these signals as will be described in greater detail below. The microprocessor 54 has a memory device 55 which stores software instructions and data for implementing at least portions of the method for controlling the electric fan 46.

Referring to FIGS. 6, 14, 16, 17 and 27, a flowchart of a method of assembling a portion of the battery module 34 in accordance with another exemplary embodiment is provided.

At step 900, a user provides the battery cells 154, 184. After step 900, the method advances to step 902.

At step 902, the user provides the frame member 120 having the substantially rectangular ring-shaped outer plastic frame 260 and the heat exchanger 264. The heat exchanger 264 has first and second thermally conductive plates 360, 362 that are coupled together and define a flow path portion 540 (shown in FIG. 17) extending therethrough. The flow path portion 540 has at least flow path subportions 554, 558 extending through the first and second thermally conductive plates 360, 362. The substantially rectangular ring-shaped outer plastic frame 260 is coupled around an outer peripheral region of the first and second thermally conductive plates 360, 362. The substantially rectangular ring-shaped outer plastic frame 260 has first, second, third, and fourth side walls 280, 282, 284, 286. The first and second side walls 280, 282 extend substantially parallel to one another. The third and fourth side walls 284, 286 are coupled between the first and second side walls 280, 282 and extend substantially parallel to one another and perpendicular to the first and second side walls 280, 282. The first side wall 280 has apertures 302, 304 (shown in FIG. 14) extending therethrough that communicate with the flow path subportions 554, 558, respectively. The second side wall 282 has apertures 312, 314 (shown in FIG. 17) extending therethrough that communicate with the flow path subportions 554, 558, respectively. After step 902, the method advances to step 904.

At step 904, the user disposes the battery cell 154 on and against a first side of the first thermally conductive plate 360 of the heat exchanger 264. After step 904, the method advances to step 906.

At step 906, the user disposes the battery cell 184 on and against the first side of the first thermally conductive plate 360 of the heat exchanger 264. The battery cell 184 is further disposed proximate to the battery cell 154. After step 906, the method advances to step 908.

At step 908, the user provides battery cells 158, 188 and the frame member 124 having the heat exchanger 572. After step 908, the method advances to step 910.

At step 910, the user disposes the battery cell 158 on and against the battery cell 154. After step 910, the method advances to step 912.

At step 912, the user disposes the battery cell 188 on and against the battery cell 184. After step 912, the method advances to step 914.

At step 914, the user disposes the heat exchanger 572 on the battery cells 158, 188.

Figure 28:
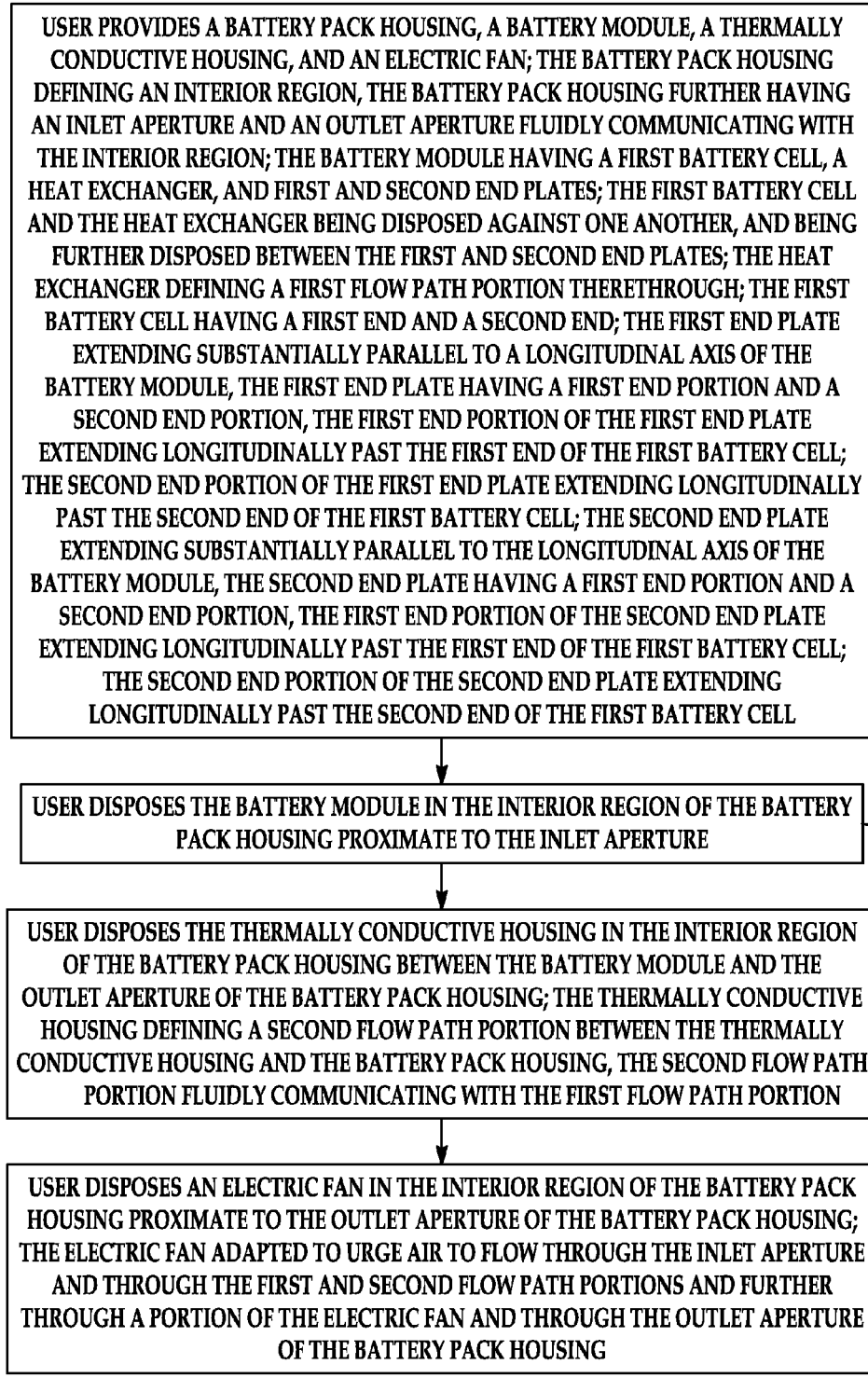
FIG. 28 is a flowchart of a method of assembling a battery pack in accordance with another exemplary embodiment.

Referring to FIGS. 2, 6 and 28, a flowchart of a method of assembling the battery pack 10 in accordance with another exemplary embodiment is provided.

At step 930, the user provides the battery pack housing 30, the battery module 34, the thermally conductive housing 38, and the electric fan 46. The battery pack housing 30 defines the interior region 74. The battery pack housing 30 further includes the inlet aperture 112 and the outlet aperture 114 communicating with the interior region 74. The battery module 34 has the battery cell 154, the heat exchanger 264, and end plates 230, 232. The battery cell 154 and the heat exchanger 264 are disposed against one another, and are further disposed between the end plates 230, 232. The heat exchanger 264 defines a flow path portion 540 therethrough. The battery cell 154 has a first end and a second end. The end plate 230 extends substantially parallel to the longitudinal axis 768 of the battery module 34. The end plate 230 has the first end portion 770 and the second end portion 772. The first end portion 770 of the end plate 230 extends longitudinally past the first end of the battery cell 154. The second end portion 772 of the end plate 230 extends longitudinally past the second end of the battery cell 154. The end plate 232 extends substantially parallel to the longitudinal axis 768 of the battery module 34. The end plate 232 having the first end portion 780 and the second end portion 782. The first end portion 780 of the end plate 232 extends longitudinally past the first end of the battery cell 154. The second end portion 782 of the end plate 232 extends longitudinally past the second end of the battery cell 154. After step 930, the method advances to step 932.

At step 932, the user disposes the battery module 34 in the interior region 74 of the battery pack housing 30 proximate to the inlet aperture 112. After step 932, the method advances to step 934.

At step 934, the user disposes the thermally conductive housing 38 in the interior region 74 of the battery pack housing 30 between the battery module 34 and the outlet aperture 114 of the battery pack housing 30. The thermally conductive housing 38 defines the path portion 804 between the thermally conductive housing 38 and the battery pack housing 30. The flow path portion 804 fluidly communicates with the flow path portion 540. After step 934, the method advances to step 936.

At step 936, the user disposes the electric fan 46 in the interior region 74 of the battery pack housing 30 proximate to the outlet aperture 114 of the battery pack housing 30. The electric fan 46 is adapted to urge air to flow through the inlet aperture 112 and through the path portions 540, 804 and further through a portion of the electric fan 46 and through the outlet aperture 114 of the battery pack housing 30.

Referring to FIGS. 6, 29 and 30, a first exemplary table 960 stored in the memory device 55 which can be utilized by the microprocessor 54 for controlling an operational speed of the electric fan 46 for cooling the battery module 34 and the DC-DC voltage converter 42 is illustrated. The table 960 includes records 962, 964, 966, 968, 970, 972, 974, 976, 978, 980, 982. Each record includes the following fields: (i) fan speed percentage value, (ii) battery cell temperature, (iii) DC-DC voltage converter temperature, and (iv) a DC-DC voltage converter output power level. The fan speed percentage value corresponds to a percentage of a threshold or maximum operational speed (e.g., 13,000 RPM) associated with the electric fan 46. The microprocessor 54 determines a battery cell temperature level, a DC-DC voltage converter temperature level, and a DC-DC voltage converter output power level and then utilizes these values as indexes in the table 960 to determine corresponding fan speed percentage values for the electric fan 46. Then, the microprocessor 54 selects the highest fan speed percentage value from the three values, and then generates a control value that induces the electric fan 46 to operate at an operational speed corresponding to the highest fan speed percentage value. For example, if a battery cell temperature value equals 38 degrees Celsius, the microprocessor 54 can access the record 964 and select a first fan speed percentage value of 0.1 corresponding to 10% of a threshold operational speed of the electric fan 46. Further, if a DC-DC voltage converter temperature value equals 90 degrees Celsius, the microprocessor 54 can access the record 966 and select a second fan speed percentage value of 0.2 corresponding to 20% of a threshold operational speed of the electric fan 46. Further, if a DC-DC voltage converter output power level is 750 Watts, the microprocessor 54 can access the record 968 and select a third fan speed percentage value of 0.3 corresponding to 30% of a threshold operational speed of the electric fan 46. Thereafter, the microprocessor 54 selects the highest of the fan speed percentage values of 0.1, 0.2, and 0.3 which corresponds to 0.3 for controlling the electric fan 46.

Referring to FIGS. 6 and 31-33, a flowchart of a method for controlling operation of the electric fan 46 in the battery pack 10 in accordance with another exemplary embodiment will be explained.

At step 1020, the operator provides the battery pack having the battery pack housing 30, the battery module 34, the DC-DC voltage converter 42, the first temperature sensor 48, the second temperature sensor 50, and the microprocessor 54. The battery pack housing 30 defines the interior region 74 having the first interior space 76 and the second interior space 78. The battery pack housing 30 has the inlet aperture 112 communicating with the first interior space 76, and the outlet aperture 114 communicating with the second interior space 78. The battery module 34 is disposed in the first interior space 76 of the battery pack housing 30 proximate to the inlet aperture 112. The battery module 34 has at least one battery cell disposed against a heat exchanger 264. The heat exchanger 264 is configured to receive air that enters the first interior space 76 from the inlet aperture 112 to cool the at least one battery cell (e.g., battery cell 150). The DC-DC voltage converter 42 is disposed in the second interior space 78 such that the air flowing proximate to the heat exchanger 264 further cools the DC-DC voltage converter 42. The electric fan 46 is adapted to urge the air to flow from the inlet aperture 112 through the first and second interior spaces 76, 78 to the outlet aperture 114 of the battery pack housing 30. The first temperature sensor 48 is disposed in the first interior space 76. The second temperature sensor 50 is disposed in the second interior space 78. The microprocessor 54 is operably coupled to the first and second temperature sensors 48, 50. After step 1020, the method advances to step 1022.

At step 1022, the first temperature sensor 48 generates a first signal indicative of a first temperature level of the battery cell that is received by the microprocessor 54. After step 1022, the method advances to step 1024.

At step 1024, the second temperature sensor 50 generates a second signal indicative of a second temperature level of the DC-DC voltage converter 42 that is received by the microprocessor 54. After step 1024, the method advances to step 1026.

At step 1026, the microprocessor 54 determines an amount of electrical power being output by the DC-DC voltage converter 42. In an exemplary embodiment, the microprocessor 54 receives a signal from the power level sensor 52 indicative of an amount of power being output by the DC-DC voltage converter 42, and the microprocessor 54 determines the amount of electrical power being output, based on the signal. After step 1026, the method advances to step 1032.

At step 1032, the microprocessor 54 determines a first fan speed percentage value of the electric fan 46 based on the first temperature level. After step 1032, the method advances to step 1034.

At step 1034, the microprocessor 54 determines a second fan speed percentage value of the electric fan 46 based on the second temperature level. After step 1034, the method advances to step 1036.

At step 1036, the microprocessor 54 determines a third fan speed percentage value of the electric fan 46 based on the amount of electrical power being output by the DC-DC voltage converter 42. After step 1036, the method advances to step 1038.

At step 1038, the microprocessor 54 makes a determination as to whether the first fan speed percentage value is greater than or equal to the second fan speed percentage value, and whether the first fan speed percentage value is greater than or equal to the third fan speed percentage value. If the value of step 1038 equals "yes", the method advances to step 1040. Otherwise, the method advances to step 1044.

At step 1040, the microprocessor 54 selects the first fan speed percentage value. After step 1040, the method advances to step 1042.

At step 1042, the microprocessor 54 generates a first control signal that induces the electric fan 46 to operate at an operational speed corresponding to the first fan speed percentage value. After step 1042, the method returns to step 1022.

Referring again to step 1038, if the value of step 1038 equals "no", the method advances to step 1044. At step 1044, the microprocessor 54 makes a determination as to whether the second fan speed percentage value is greater than or equal to the first fan speed percentage value, and whether the second fan speed percentage value is greater than or equal to the third fan speed percentage value. After step 1044, the method advances to step 1046.

At step 1046, the microprocessor 54 selects the second fan speed percentage value. After step 1046, the method advances to step 1052.

At step 1052, the microprocessor 54 generates a second control signal that induces the electric fan 46 to operate at an operational speed corresponding to the second fan speed percentage value. After step 1052, the method advances to step 1054.

At step 1054, the microprocessor 54 makes a determination as to whether the third fan speed percentage value is greater than or equal to the first fan speed percentage value, and whether the third fan speed percentage value is greater than or equal to the second fan speed percentage value. If the value of step 1054 equals "yes", the method advances to step 1056. Otherwise, the method returns to step 1022.

At step 1056, the microprocessor 54 selects the third fan speed percentage value. After step 1056, the method advances to step 1058.

At step 1058, the microprocessor 54 generates a third control signal that induces the electric fan 46 to operate at an operational speed corresponding to the third fan speed percentage value.

Figures 33, 34:
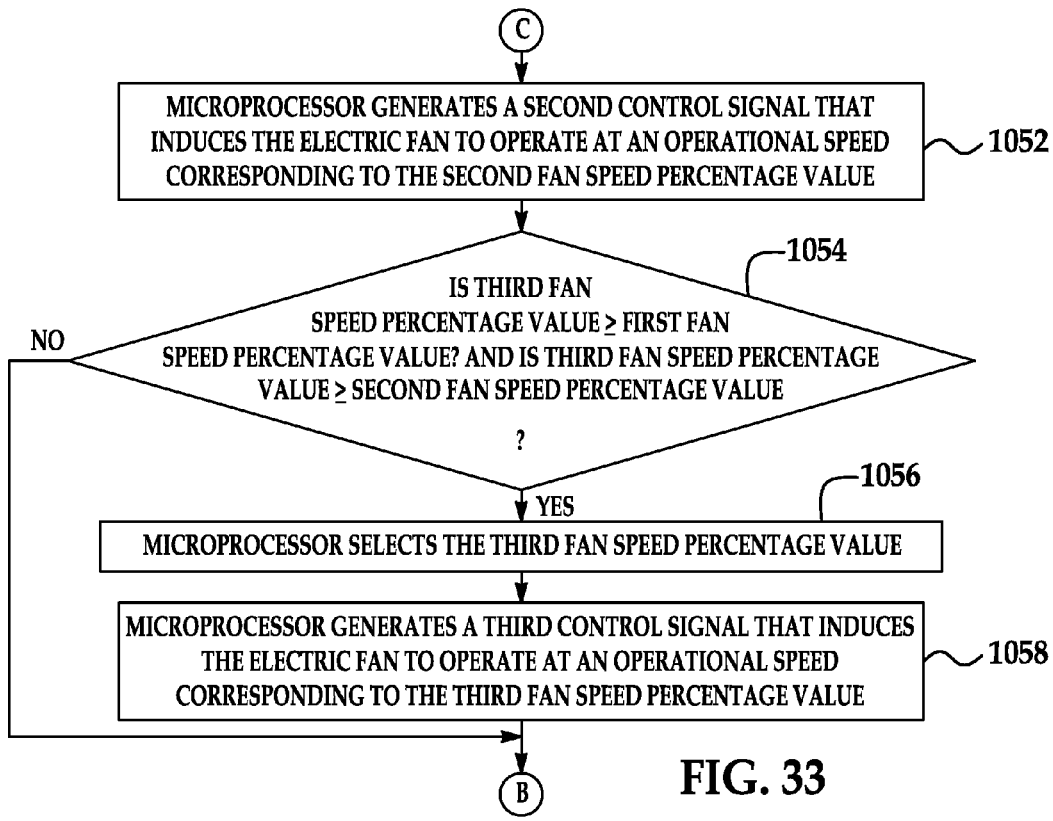
FIG. 34 is a second exemplary table utilized by the battery pack of FIG. 1.

Referring to FIGS. 29 and 34, a second exemplary table 1160 stored in the memory device 55 which can be utilized by the microprocessor 54 for controlling an operational speed of the electric fan 46 for cooling the battery module 34 and the DC-DC voltage converter 42 is illustrated. The table 1160 is substantially similar to the first table 960 except that the DC-DC voltage converter output power level is not present in the records. The table 1160 includes records 1162, 1164, 1166, 1168, 1170, 1172, 1174, 1176, 1178, 1180, 1182. Each record includes the following fields: (i) fan speed percentage value, (ii) battery cell temperature and (iii) DC-DC voltage converter temperature. The fan speed percentage value corresponds to a percentage of a threshold or maximum operational speed (e.g., 13,000 RPM) associated with the electric fan 46. The microprocessor 54 determines a battery cell temperature level, and a DC-DC voltage converter temperature level and then utilizes these values as indexes in the table 1160 to determine corresponding fan speed percentage values for the electric fan 46. Then, the microprocessor 54 selects the highest fan speed percentage value from the two values, and then generates a control value that induces the electric fan 46 to operational at an operational speed corresponding to the highest fan speed percentage value. For example, if a battery cell temperature value equals 38 degrees Celsius, the microprocessor 54 can access the record 1164 and select a first fan speed percentage value of 0.1 corresponding to 10% of a threshold operational speed of the electric fan 46. Further, if a DC-DC voltage converter temperature value equals 90 degrees Celsius, the microprocessor 54 can access the record 1166 and select a second fan speed percentage value of 0.2 corresponding to 20% of a threshold operational speed of the electric fan 46. Thereafter, the microprocessor 54 selects the highest of the fan speed percentage value of 0.1 and 0.2 which corresponds to 0.2 for controlling the electric fan 46.

Figure 35:
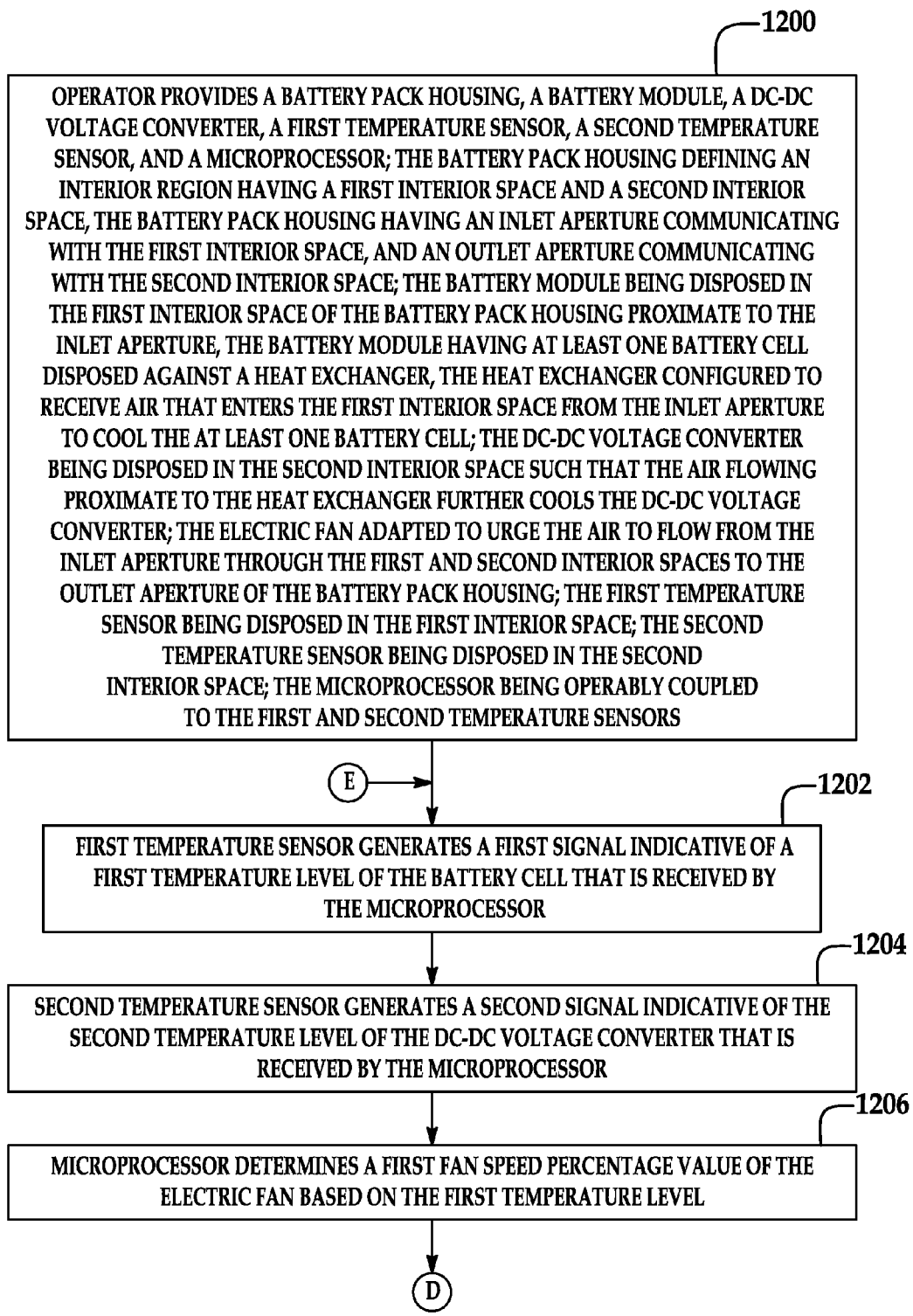
FIGS. 35-36 are flowcharts of a method for controlling operation of an electric fan in the battery pack of FIG. 1 in accordance with another exemplary embodiment.
Figure 36:
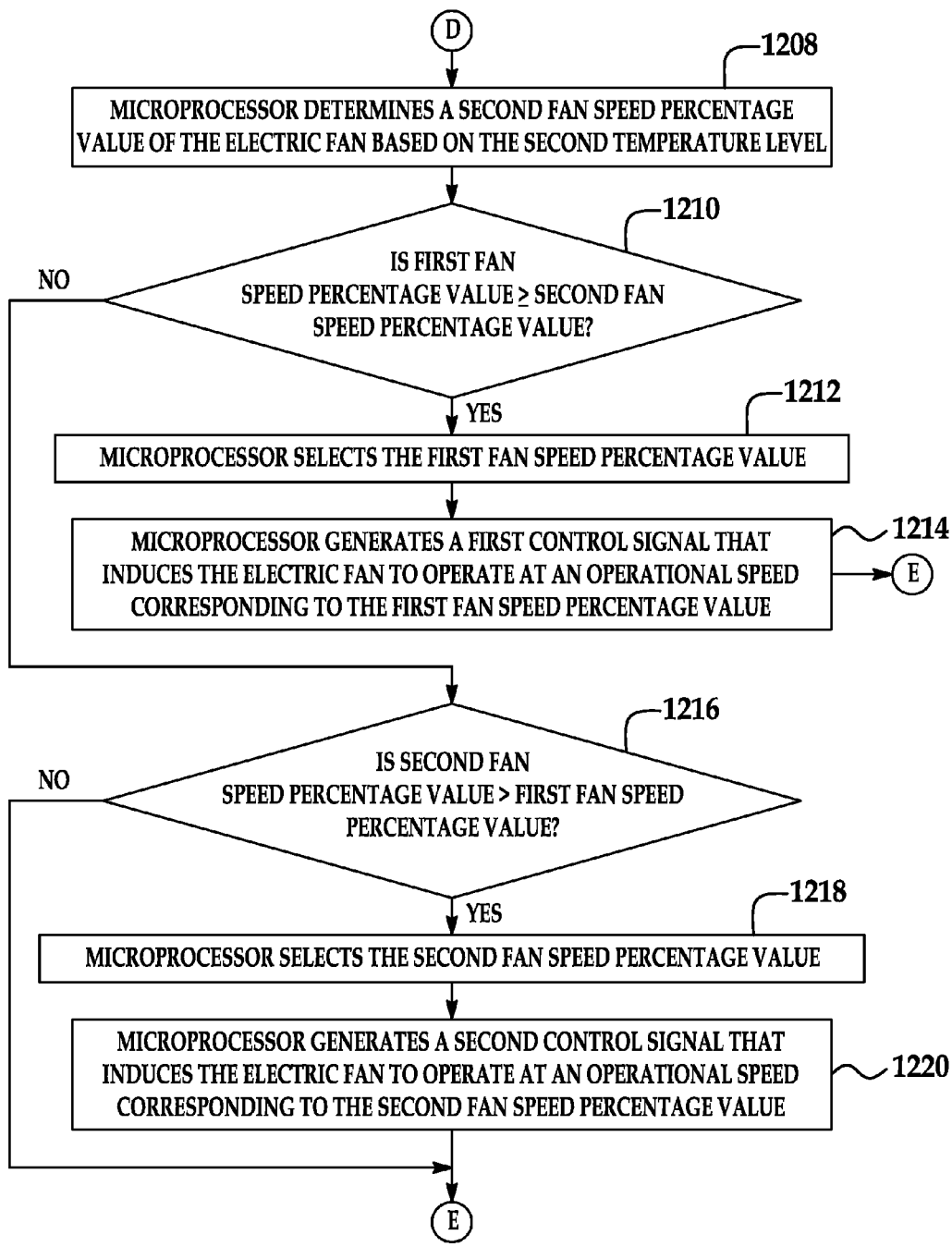

Referring to FIGS. 6 and 34-35, a flowchart of a method for controlling operation of the electric fan 46 in the battery pack 10 in accordance with another exemplary embodiment will be explained.

At step 1200, the operator provides the battery pack 10 having the battery pack housing 30, the battery module 34, the DC-DC voltage converter 42, the first temperature sensor 48, the second temperature sensor 50, and the microprocessor 54. The battery pack housing 30 defines the interior region 74 having the first interior space 76 and the second interior space 78. The battery pack housing 30 has the inlet aperture 112 communicating with the first interior space 76, and the outlet aperture 114 communicating with the second interior space 78. The battery module 34 is disposed in the first interior space 76 of the battery pack housing 30 proximate to the inlet aperture 112. The battery module 34 has at least one battery cell (e.g., battery cell 150) disposed against the heat exchanger 264. The heat exchanger 264 is configured to receive air that enters the first interior space 76 from the inlet aperture 112 to cool the at least one battery cell. The DC-DC voltage converter 42 is disposed in the second interior space 78 such that the air flowing proximate to the heat exchanger 264 further cools the DC-DC voltage converter 42. The electric fan 46 is adapted to urge air to flow from the inlet aperture 112 through the first and second interior spaces 76, 78 to the outlet aperture 114 of the battery pack housing 30. The first temperature sensor 48 is disposed in the first interior space 76. The second temperature sensor 50 is disposed in the second interior space 78. The microprocessor 54 is operably coupled to the first and second temperature sensors 48, 50.

At step 1202, the first temperature sensor 48 generates a first signal indicative of a first temperature level of the battery cell 150 that is received by the microprocessor 54. After step 1202, the method advances to step 1204.

At step 1204, the second temperature sensor 50 generates a second signal indicative of a second temperature level of the DC-DC voltage converter 42 that is received by the microprocessor 54. After step 1204, the method advances to step 1206.

At step 1206, the microprocessor 54 determines a first fan speed percentage value of the electric fan 46 based on the first temperature level. After step 1206, the method advances to step 1208.

At step 1208, the microprocessor 54 determines a second fan speed percentage value of the electric fan 46 based on the second temperature level. After step 1208, the method advances to step 1210.

At step 1210, the microprocessor 54 makes a determination as to whether the first fan speed percentage value is greater than or equal to the second fan speed percentage value. If the value of step 1210 equals "yes", the method advances to step 1212. Otherwise, the method advances to step 1216.

At step 1212, the microprocessor 54 selects the first fan speed percentage value. After step 1212, the method advances to step 1214.

At step 1214, the microprocessor 54 generates a first control signal that induces the electric fan 46 to operate at an operational speed corresponding to the first fan speed percentage value. After step 1214, the method returns to step 1202.

Referring again to step 1210, if the value of step 1210 equals "no", the method advances to step 1216. At step 1216, the microprocessor 54 makes a determination as to whether the second fan speed percentage value is greater than the first fan speed percentage value. If the value of step 1216 equals "yes", the method advances to step 1218. Otherwise, the method returns to step 1202.

At step 1218, the microprocessor 54 selects the second fan speed percentage value. After step 1218, the method advances to step 1220.

At step 1220, the microprocessor 54 generates a second control signal that induces the electric fan 46 to operate at an operational speed corresponding to the second fan speed percentage value. After step 1220, the method returns to step 1202.

The microprocessor 54 is provided to execute software algorithms for implementing at least part of the methods described in FIGS. 31-33 and 35-36. In particular, the foregoing methods described herein can be at least partially embodied in the form of one or more computer readable media having computer-executable instructions for practicing the methods. The computer-readable media can comprise one or more volatile memory devices and/or one or more non-volatile memory devices wherein when the computer-executable instructions are loaded into one or more of the memory devices and executed by the microprocessor 54, the microprocessor 54 becomes an apparatus programmed to implement at least part of the methods described herein.

The battery pack 10 and the methods of controlling the electric fan 46 for cooling the battery module 34 and the DC-DC voltage converter 42 provide a substantial advantage over other battery packs and methods. In particular, the battery pack 10 has a microprocessor 54 that monitors first and second temperature levels of the battery module 34 and the DC-DC voltage converter 42, respectively, and determines first and second fan speed percentage values, respectively, for the electric fan 46 based on the first and second temperature levels, respectively. Thereafter, the microprocessor 54 selects the highest fan speed percentage value from the first and second fan speed percentage values for controlling the operational speed of the electric fan 46.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack, comprising:
    a battery pack housing having a bottom wall, first, second, third, and forth side walls, and an upper cover defining and interior region; the first, second, third, and fourth side walls being coupled to the bottom wall and extending upwardly from the bottom wall; the interior region having a first interior space and a second interior space, the first side wall having an inlet aperture extending therethrough that communicates with the first interior space, and the second side wall having an outlet aperture extending therethrough that communicates with the second interior space, the upper cover being coupled to the fist, second, third, and forth side walls;
    a battery module being disposed in the first interior space of the battery pack housing and proximate to the inlet aperture, the battery module further having a longitudinal axis extending from the inlet aperture and through the battery module toward a DC-DC voltage converter, the battery module having first and second end plates, a first battery cell, and a first heat exchanger; the first battery cell being disposed against and directly contacting a top side of the first end plate and further directly contacting a bottom side of the fist heat exchanger; the fist battery cell and the fist heat exchanger being disposed between the first and the second end plates; the first end plate having a first end portion that extends longitudinally past a first end of the fist battery cell and directly contacts the fist side wall of the battery pack housing below the inlet aperture; the fist end plate extending from the fist side wall toward the DC-DC voltage converter; the second end plate having a fist end portion that extends longitudinally past the fist end of the first battery cell and directly contacts the fist side wall of the battery pack housing above the inlet aperture; the second end plate extending from the fist side wall toward the DC-DC voltage converter; the first end portion of the fist end plate and the first end portion of the second end plate directing air from the inlet aperture to the fist heat exchanger, the first heat exchanger configured to receive the air through an internal region of the fist heat exchanger to cool the fist battery cell;
    the DC-DC voltage converter being disposed in the second interior space and between the first and second side walls such that the air flowing from the first heat exchanger further cools the DC-DC voltage converter;
    an electric fan adapted to urge the air to flow from the inlet aperture through the first and second interior spaces to the outlet aperture of the battery pack housing;
    a first temperature sensor being disposed in the first interior space, the first temperature sensor adapted to generate a first signal indicative of a first temperature level of the first battery cell;
    a second temperature sensor being disposed in the second interior space, the second temperature sensor adapted to generate a second signal indicative of a second temperature level of the DC-DC voltage converter;
    a microprocessor operably coupled to the first and second temperature sensors such that the microprocessor receives the first and second signals, respectively, the microprocessor further operably coupled to the electric fan;
    the microprocessor being programmed to determine a first fan speed percentage value of the electric fan based on the first temperature level, the first fan speed percentage value corresponding to a first percentage of a threshold operational speed value associated with the electric fan;
    the microprocessor being further programmed to determine a second fan speed percentage value of the electric fan based on the second temperature level, the second fan speed percentage value corresponding to a second percentage of the threshold operational speed value associated with the electric fan; and the microprocessor being further programmed to select the first fan speed percentage value if the first fan speed percentage value is greater than the second fan speed percentage value; and the microprocessor being further programmed to generate a first control signal that induces the electric fan to operate at an operational speed corresponding to the first fan speed percentage value if the first fan speed percentage value is selected.

2. The battery pack of claim 1, wherein:

the microprocessor being further programmed to select the second fan speed percentage value if the second fan speed percentage value is greater than the first fan speed percentage value; and the microprocessor being further programmed to generate a second control signal that induces the electric fan to operate at an operational speed corresponding to the second fan speed percentage value if the second fan speed percentage value is selected.

3. The battery pack of claim 1, wherein:

the microprocessor being further programmed to determine an amount of electrical power being output by the DC-DC voltage converter;

the microprocessor being further programmed to determine a third fan speed percentage value of the electric fan based on the amount of electrical power being output by the DC-DC voltage converter, the third fan speed percentage value corresponding to a third percentage of the threshold operational speed value associated with the electric fan;

the microprocessor being further programmed to select the third fan speed percentage value if the third fan speed percentage value is greater than the first fan speed percentage value, and if the third fan speed percentage value is greater than the second fan speed percentage value; and the microprocessor being further programmed to generate a third control signal that induces the electric fan to operate at an operational speed corresponding to the third fan speed percentage value if the third fan speed percentage value is selected.

4. The battery pack of claim 1, further comprising a thermally conductive housing being disposed in the second interior space, the thermally conductive housing having the DC-DC voltage converter disposed therein.

5. The battery pack of claim 1, wherein the electric fan being disposed in the second interior space proximate to the outlet aperture.

6. The battery pack of claim 1, wherein the DC-DC voltage converter is electrically coupled to at least one of the first, second, third, and fourth battery cells of the battery module.

7. The battery pack of claim 1, wherein the first heat exchanger includes first and second thermally conductive plates that are coupled together and define a flow path portion, the flow path portion extending longitudinally between the first and second thermally conductive plates.

8. The battery pack of claim 7, wherein the first thermally conductive plate is substantially rectangular-shaped and is constructed of aluminum.

9. The battery pack of claim 1, wherein:

the battery module further includes second and third battery cells and a second heat exchanger, the second battery cell being disposed against and contacting a top side of the fist heat exchanger, the third battery cell being disposed against and contacting a top side of the second battery cell and a bottom side of the second heat exchanger, the first and second heat exchangers extending parallel to the longitudinal axis.

10. The battery pack of claim 9, wherein a portion of the air flows longitudinally through the first heat exchanger toward the outlet aperture to cool the first and second battery cells, and another portion of the air flows longitudinally through the second heat exchanger toward the outlet aperture to cool the third battery cell.

* * * * *